United States Patent
Iwahara et al.

(10) Patent No.: US 6,373,654 B1
(45) Date of Patent: Apr. 16, 2002

(54) DISK DEVICE AND APPARATUS FOR WRITING REFERENCE SIGNAL INTO THE DEVICE

(75) Inventors: Hiroyuki Iwahara; Keiji Aruga; Mitsuaki Yoshida; Yasuyoshi Asao; Yasuhiro Miura; Tsuneyori Ino; Terushige Arai; Kazunori Tochiyama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/603,872

(22) Filed: Jun. 26, 2000

Related U.S. Application Data

(62) Division of application No. 09/012,390, filed on Jan. 23, 1998, now abandoned.

(30) Foreign Application Priority Data

Mar. 19, 1997 (JP) .............................. 9-066628
May 2, 1997 (JP) .............................. 9-114851

(51) Int. Cl.⁷ .............................................. G11B 33/08
(52) U.S. Cl. ................................................ 360/97.01
(58) Field of Search ........................... 360/97.01, 97.02, 360/97.03

(56) References Cited

U.S. PATENT DOCUMENTS 4,553,183 A * 11/1985 Brown et al. ............. 360/97.01
5,282,100 A * 1/1994 Tacklind et al. .......... 360/97.02
5,349,486 A   9/1994 Sugimoto et al. ......... 360/97.01
5,598,306 A   1/1997 Frees et al. .............. 360/97.02
5,666,239 A * 9/1997 Pottebaum ................ 360/97.03
5,673,157 A * 9/1997 Ycas et al. ............... 360/97.01
5,673,159 A   9/1997 Jinbo et al. .............. 360/98.01
5,790,344 A * 8/1998 Allen ....................... 360/97.02
5,898,537 A * 4/1999 Oizumi et al. ............ 360/97.01

FOREIGN PATENT DOCUMENTS

| DE | 4429900 | 3/1995 | |
| JP | 58-159201 | * 9/1983 | ............. 360/97.01 |
| JP | 61216189 | 9/1986 | |
| JP | 1243277 | 9/1989 | |
| JP | 233781 | 2/1990 | |
| JP | 4301277 | 10/1992 | |
| JP | 6180953 | 6/1994 | |
| JP | 7220423 | 8/1995 | |

* cited by examiner

Primary Examiner—David L. Ometz
(74) Attorney, Agent, or Firm—Greer, Burns & Crain, Ltd.

(57) ABSTRACT

A disk device has a housing structure capable of reducing unnecessary vibrations of the base of the disk device by improving the rigidity thereof. A bath-tub type base of the disk device includes a damping structure on the bottom or on the sides adjacent to the bottom for attenuating the vibrations of the base. Apparatus for writing a reference signal into the disk of the device using a reference head with a head insertion hole formed in the base is also provided.

10 Claims, 25 Drawing Sheets

Fig.8B
Fig.8A
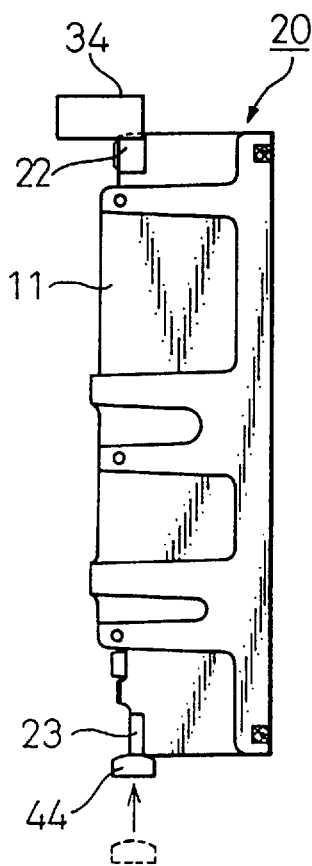
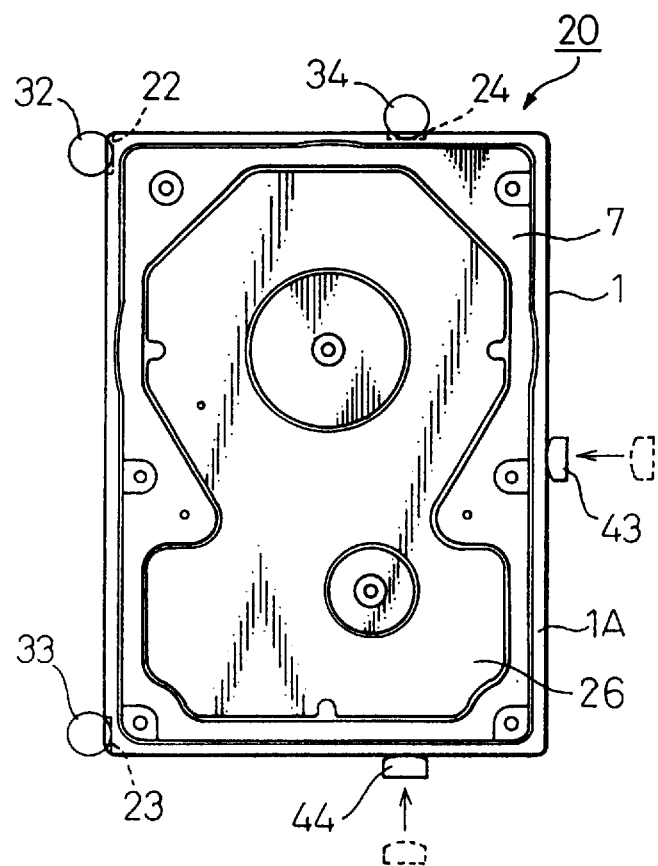
Fig.8C
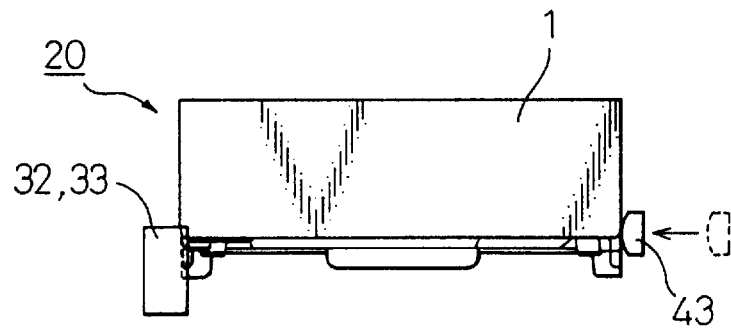

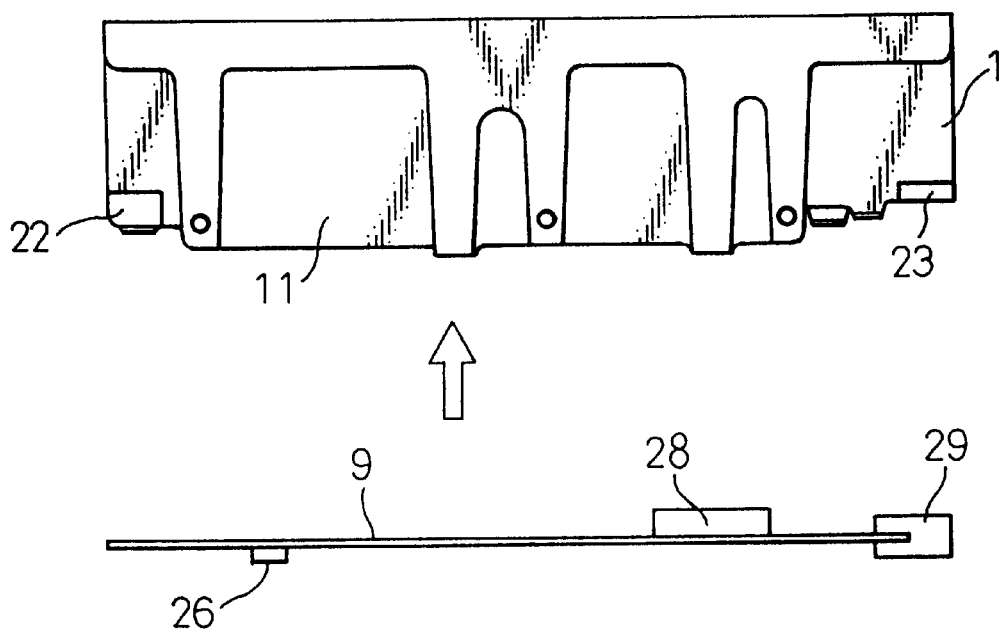
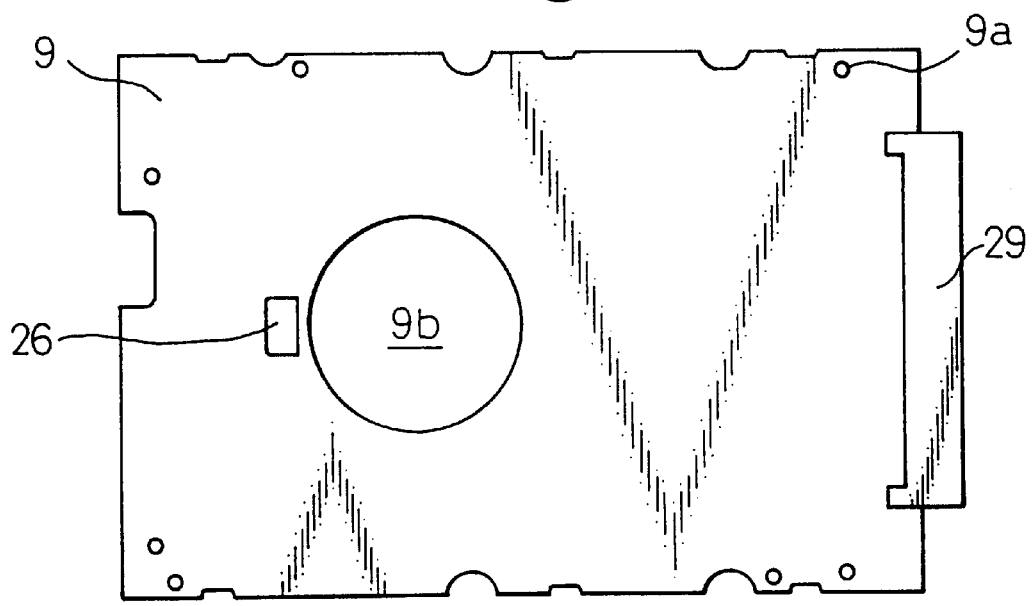

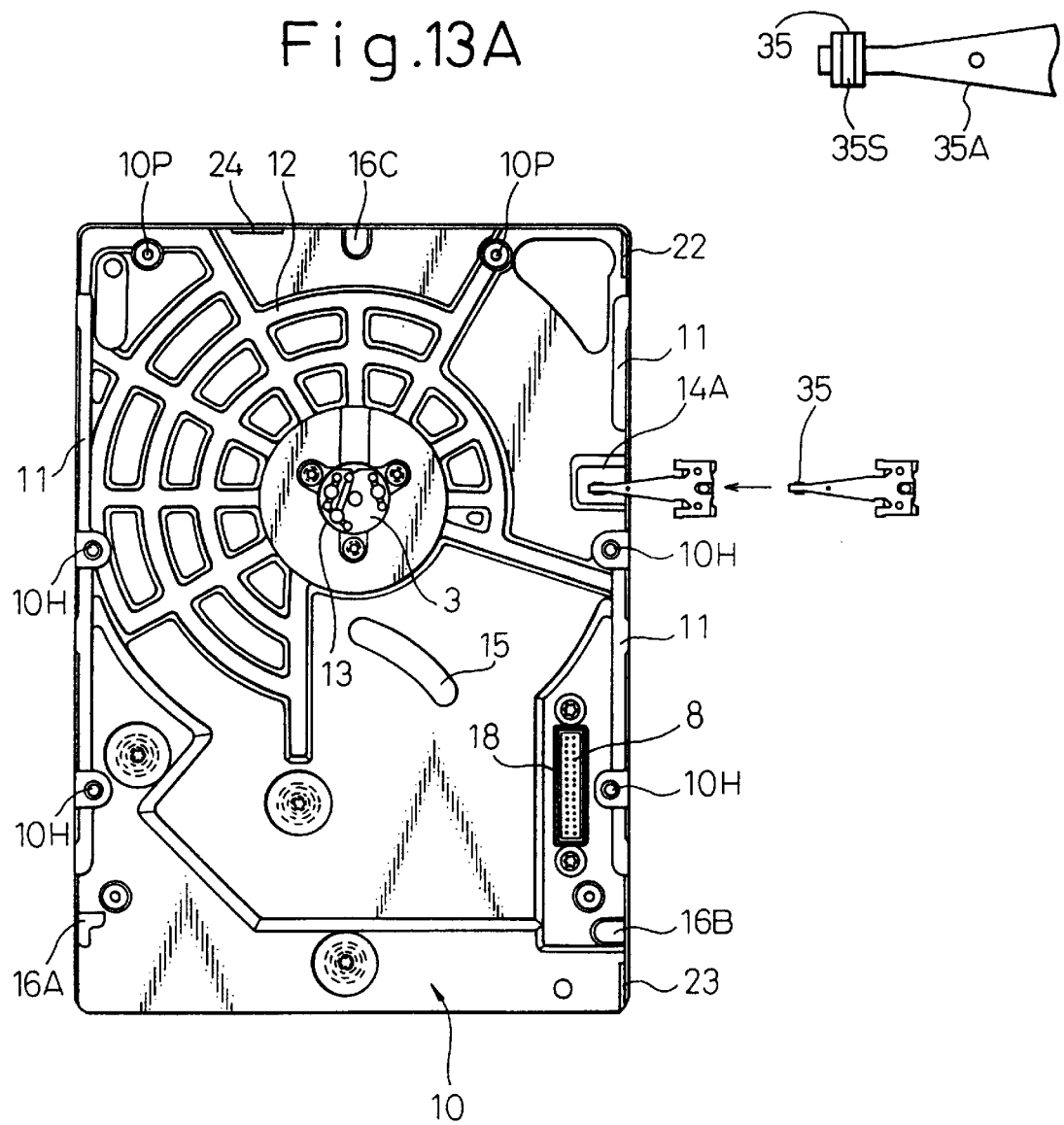

DISK DEVICE AND APPARATUS FOR WRITING REFERENCE SIGNAL INTO THE DEVICE

This is a divisional, of application Ser. No. 09/012,390, filed Jan. 23, 1998, now abandoned.

BACKGROUND OF THE INVENTION

1. Field of the Invention

The present invention relates to a disk device and an apparatus for writing a reference signal into the disk device or, in particular, to a housing structure of a disk device and an apparatus for writing a reference signal into the disk device, in which the unnecessary base vibration is reduced by improving the base rigidity to thereby realize a very close track pitch in the disk device.

2. Description of the Related Art

In recent years, disk devices such as magnetic disk devices and optical disk devices have found applications as an external storage units of computers. Signals are transmitted and received at ever-increasing speeds between the head and the control circuit of these disk devices and the storage capacity of the disk devices is increased every year. Once the disk size is fixed, the storage capacity is improved by increasing the TPI (tracks per inch) and hence reducing the pitch of the tracks on the disk.

With the increased density of the tracks due to an increased TPI, a slight vibration may displace the head from an intended track to deteriorate the reliability of the disk device. A disk device having a disk built therein having high-density tracks, therefore, is desirably improved in base rigidity to reduce vibration.

A conventional magnetic disk device which is a kind of a disk device generally comprises a bath-tub type of base housing therein at least a disk, a spindle motor for rotating the disk, a carriage with a head at the forward end thereof and an actuator having a voice coil motor. This base is enclosed by a cover through a gasket. In this magnetic disk device, the signal reproduced by the head is withdrawn out of the actuator by a flexible circuit board mounted on the side of the carriage and led to and demodulated by a circuit on a fixed board protruded from the bottom of the base.

The magnetic disk device requires work called a servo track write operation for writing the servo information as a reference signal into the disk at the time of manufacture thereof. This servo track write operation is performed with all the parts built into the magnetic disk device. At the time of servo track write operation, first, a reference head is inserted into the base from outside of the magnetic disk device, and a reference signal is written on the outermost peripheral portion of the disk on which nothing has been written. The outermost peripheral portion of the disk in which the reference signal is written is where nothing can be read from by the built-in head. Then, the reference signal thus written is reproduced by the reference head thereby to confirm the disk position, and the internal head is driven by an external source in accordance with the detected position thereby to write the servo information in the disk.

Generally, the disk in which the reference signal is written is located close to the base bottom. For this reason, a reference head insertion hole from which to insert the reference head is formed in the side of the base. Upon completion of the servo track write operation, the reference head is withdrawn out of the reference head insertion hole, which is then hermetically enclosed by attaching a seal over it.

In the conventional disk device, the base is vibrated by the rotation of the spindle motor at the time of servo track write operation, thereby deteriorating the quality of the servo signal written under that condition. There has not been available any means capable of writing the reference signal while suppressing the vibration of the disk device.

Further, in the case where the actuator of the conventional magnetic disk device is placed on a predetermined track while the device is in use, the vibration generated by the rotation of the spindle motor is transmitted to the base through the mounting end thereof thereby causes vibration of the base, or the base is vibrated due to the fact that the base bottom is flat, with the result that it becomes difficult for the actuator to remain stationary. In the worst case, the data cannot be read.

Furthermore, consider the conventional seek operation in which the actuator moves to a predetermined track of the disk while the disk device is in operation. The base is easily affected by the reaction force of the seek operation, so that the base is vibrated, thereby increasing the time required for moving to the predetermined track.

A higher density of track pitch is essential for the future realization of a high-capacity disk device. Nevertheless, the above-mentioned vibration problem makes it difficult to increase the density of the track pitch.

SUMMARY OF THE INVENTION

In view of this, a first object of the invention is to provide a housing structure of a disk device comprising a spindle motor with at least a recording disk mounted thereon, a carriage with at least a head mounted thereon for exchanging signals with the disk, an actuator for driving the carriage and a base of a bath-tub type having built therein the spindle motor, the carriage and the actuator, wherein the vibration of the base is reduced by improving the base rigidity, thereby making it possible to increase the density of track pitch.

A second object of the invention is to provide a housing structure having a reference head insertion hole for a disk device comprising a spindle motor with at least a recording disk mounted thereon, a carriage with at least a head mounted thereon for exchanging signals with the disk, an actuator for driving the carriage and a base of a bath-tub type having built therein the spindle motor, the carriage and the actuator, the disk device having such a configuration as to improve the rigidity of the base, wherein a reference signal can be written accurately in the disk at the time of manufacture of the disk device and the disk device is not adversely affected by the reference head insertion hole after writing the reference signal.

A third object of the invention is to provide an apparatus for writing a reference signal into a disk device having a housing structure for achieving the above-mentioned first and second objects.

In order to achieve the above-mentioned first object, according to the present invention, there is provided a housing structure of a disk device comprising a spindle motor with at least a recording disk mounted thereon, a carriage with at least a head mounted thereon for writing information into or reading information from the disk, an actuator for driving the carriage and a base of a bath-tub type having built therein the spindle motor, the carriage and the actuator, wherein the spindle motor, the carriage and the actuator are hermetically sealed by a cover mounted on the upper surface of the base, and the base includes a reference head insertion hole into which a reference head is inserted for writing the reference signal into the disk at the time of manufacture of the disk device, the housing structure further comprising at least a damping means mounted on the bottom of the base of a bath-tub type or on the base side adjacent to the bottom for reducing the vibration of the base.

In the first form of the damping means, the thickness of the base bottom plate is increased to a maximum within a specified base size. In the case where the disk device is of a 3.5-in. type, for example, the thickness of the base bottom plate can be increased to 5 mm or more.

According to the first form of the damping means, the increased thickness of the base bottom plate increases the base rigidity and thereby reduces the base vibration.

In a second form of the damping means, the hole for mounting the spindle motor formed in the base is reduced in size, a protrusion is formed on the base for accommodating the flange of the spindle motor, and a mounting hole of the required minimum size is formed at the forward end surface of the protrusion. In the case where the disk device is of 3.5 inch type, for example, the size of the mounting hole can be defined as 13.5 mm or less.

According to the second form of the damping means, the size of the mounting hole for the spindle motor formed in the base is so small that the base rigidity is higher than when the mounting hole is large, thus reducing the base vibrations.

In a third form of the damping means, at least a rib is formed on the base bottom. This rib is formed in such a manner as to connect at least the outer peripheral portion of the base protrusion in the second form of the damping means to at least a vibration source on the base. The base vibration source includes the longitudinal ends of the base, a threaded hole of the central shaft of the head actuator, at least a threaded hole for mounting the printed board or at least a threaded hole used for incorporating the disk device in an external device.

According to the third form of the damping means, at least a rib is arranged in such a position as to connect to at least a vibration source on the base bottom, and therefore the base rigidity is increased and the base vibrations reduced.

In a fourth form of the damping means, a pair of walls are protruded continuously from and along the two longitudinal edges of the base.

According to the fourth form of the damping means, the walls protruded continuously along the longitudinal edges of the base increase the base rigidity for a reduced base vibration.

In a fifth form of the damping means, a reference head insertion hole into which to insert a reference head is formed in the portion of the base bottom surface corresponding to the outer peripheral portion of the disk. This reference head insertion hole can alternatively be located in the neighborhood of one of the continuous walls, if any, along the longitudinal edges of the base as in the fourth form of the damping means.

According to the fifth form of the damping means, the reference head insertion hole is located in the base bottom base, and therefore the sides of the base can be reinforced to reduce the base vibrations.

In a sixth form of the damping means, first, second and third reference surfaces are formed in the neighborhood of different sides of the base bottom for fixing the disk device firmly to a reference signal writing jig in vertical direction at the time of writing a reference signal in the disk in the process of manufacture of the disk device. These first to third reference surfaces are arranged in positions in contact with the reference points formed on the jig, respectively. When fixing the disk device to the jig in vertical direction using the first to third reference surfaces, therefore, the portions of the base in vertically opposed relation to the reference surfaces can be held, and a base component member is filled between the reference surfaces and the base portions thus held. One of the first to third reference surfaces is arranged on a line dividing the line connecting the other two reference surfaces into two equal portions.

According to the sixth form of the damping means, the profile of the cover mounted on the upper surface of the base is reduced in size as compared with the base profile by more than the thickness of the base, so that the cover mounted on the mounting portion of the internal peripheral surface of the base is not protruded above the upper surface of the base. Thus, the disk device can be fixed on the jig with the cover attached thereto.

In a seventh form of the damping means, fourth, fifth and sixth reference surfaces are further added to the sixth form of the damping means for fixing the disk device firmly to the reference signal writing jig in horizontal direction in the neighborhood of a pair of adjacent sides of the base. These fourth to sixth reference surfaces are arranged in contact with the corresponding reference points respectively formed on the jig. When fixing the disk device to the jig in horizontal direction using the fourth to sixth reference surfaces, the side portions of the base in vertically opposed relationships to the reference surfaces can be held, and a base component member is filled between the reference surfaces and the side portions thus held.

According to the sixth form of the damping means, the first, second and third reference surfaces are arranged in the neighborhood of different sides, respectively, of the base bottom in such a manner as to contact the corresponding reference points on the jig for writing the reference signal in the disk device. According to the seventh form of the damping means, on the other hand, the fourth, fifth and sixth reference surfaces are formed in the neighborhood of adjacent sides of the base. When fixing the disk device to the jig at the time of manufacturing the disk device, therefore, the base is firmly fixed on the jig thereby to reduce the base vibrations.

Further, if a depression is formed on the upper surface of the cover mounted on the upper surface of the base and a damping plate is mounted in the depression, then the vibrations are reduced further.

The second object of the invention can be achieved by providing the reference head insertion hole in any of the forms described below.

In a first form of the reference head insertion hole, the reference head insertion hole is formed in the outermost peripheral portion of the disk downstream in the direction of disk rotation with respect to the position of the read/write head of the disk device.

In a second form of the reference head insertion hole, the reference head insertion hole is formed in the innermost peripheral portion of the disk downstream in the direction of disk rotation with respect to the position of the read/write head of the disk device.

In a third form of the reference head insertion hole, the reference head insertion hole is formed at least a predetermined distance away from the position of a circulation filter mounted on the base.

In a fourth form of the reference head insertion hole, the reference head insertion hole is formed on the same side as a connector of the read/write cable adapted to be withdrawn from the base.

In a fifth form of the reference head insertion hole, the reference head insertion hole is enclosed with a seal member after a reference signal is written in the disk.

In a sixth form of the reference head insertion hole, the seal member for the fifth form of the reference head insertion hole is made of a material capable of shielding an electromagnetic wave generated by an external source.

In a seventh form of the reference head insertion hole, the seal member is used also as a material for filling the space in the reference head insertion hole thereby to form a smooth and continuous boundary between the inner surface of the base and the reference head insertion hole.

According to the first to fourth forms of the reference head insertion hole of the present invention, a reference signal can be accurately written in the disk at the time of manufacture of the disk device. Also, according to the fifth to seventh forms of the reference head insertion hole of the invention, the disk device is not adversely affected by the reference head insertion hole after the reference signal is written.

An apparatus for writing a reference signal in the disk device according to the present invention, on the other hand, is for writing a reference signal into the disk device using a reference head, the disk device including a spindle motor with at least one recording disk mounted thereon, a carriage with at least one head mounted thereon for writing information into the disk or reading information from the disk, an actuator for driving the carriage, a base of a bath-tub type for accommodating the spindle motor, the carriage and the actuator therein, and a cover mounted on the upper surface of the base for hermetically sealing the spindle motor, the carriage and the actuator, wherein the base includes a reference head insertion hole by way of which the reference head is inserted for writing the reference signal into the disk at the time of manufacture of the disk device. The apparatus is fabricated in any of the forms described below.

A first form of the reference signal writing apparatus comprises a plurality of reference rests in contact with first, second and third reference surfaces, respectively, arranged in the neighborhood of different sides of the bottom of the base and having the top surfaces thereof in the same plane for fixing the base in vertical direction, a plurality of reference protrusions arranged in contact with fourth, fifth and sixth reference surfaces, respectively, formed on a pair of adjacent sides of the base for fixing the base in horizontal direction, a first holding member for pressing the first, second and third reference surfaces of the base against the reference rests, and a second holding member for pressing the fourth, fifth and sixth reference surfaces of the base against the reference protrusions.

According to the first form of the reference signal writing apparatus, the base of the disk device is firmly fixed at the time of writing the reference signal, and therefore the reference signal can be written with a high reliability.

In a second form of the reference signal writing apparatus, the reference head is an in-line type in which a head slider including a write head and an arm for holding the head slider are substantially aligned with each other.

According to the second form of the reference signal writing apparatus, the reference head can be used also as the read/head write head of the magnetic disk device.

A third form of the reference signal writing apparatus comprises a moving mechanism called a pin-pick-mechanism for moving the head actuator in the disk device with a pin and a laser displacement meter for detecting the position of the pin pick mechanism, wherein the pin pick mechanism includes a mirror for reflecting the laser light emitted from the laser displacement meter, and the reference head is arranged on the same side as the mirror.

According to the third form of the reference signal writing apparatus, the reference head is located on the same side as the pin pick mechanism, and therefore the reference head and the pin pick mechanism can be driven on the same side, thereby reducing the size of the mechanism of the reference signal writing apparatus.

In a fourth form of the reference signal writing apparatus, the reference head is loaded in or unloaded from the disk device by a holding mechanism which operates to move the reference head toward or away from the disk surface in substantially the vertical direction.

According to the fourth form of the reference signal writing apparatus, the reference head insertion hole can be formed in the base bottom of the disk device.

In a fifth form of the reference signal writing apparatus, the reference head is mounted replaceably on the holding mechanism.

According to the fifth form of the reference signal writing apparatus, the reference head can be easily replaced when worn out, and thus the operating efficiency of the reference signal writing apparatus can be improved.

A sixth form of the reference signal writing apparatus comprises a protective cover mounted on the apparatus body for protecting the reference head not in use.

According to the sixth form of the reference signal writing apparatus, the reference head can be protected while not in use.

In a seventh form of the reference signal writing apparatus, the protective cover is so constructed as to automatically open when the disk device is loaded in the reference signal writing apparatus.

According to the seventh form of the reference signal writing apparatus, the insertion of the reference head into the disk device can be automated while protecting the reference head.

BRIEF DESCRIPTION OF THE DRAWINGS

The present invention will be more clearly understood from the description as set forth below with reference to the accompanying drawings, wherein:

FIGS. 8A to 8C are diagrams for explaining a method of fixing in horizontal direction a magnetic disk device according to the first embodiment of the invention on the servo track writer of FIG. 7, in which FIG. 8A is a diagram for explaining relative positions of the magnetic disk device, three studs and the X, Y clampers, FIG. 8B is a diagram for explaining relative positions of the magnetic disk device and the Y clamper, and FIG. 8C is a diagram for explaining relative positions of the magnetic disk device and the X clamper;

FIGS. 9A to 9C are diagrams for explaining a method of fixing in vertical direction a magnetic disk device according to the first embodiment of the invention mounted on the servo track writer of FIG. 7, in which FIG. 9A is a diagram for explaining relative positions of the base of the magnetic disk device and three holding portions, FIG. 9B is a sectional view of the magnetic disk device showing the positions of the holding portions in the longitudinal direction thereof, and FIG. 9C is a sectional view of the magnetic disk device showing the positions of the holding portions in the direction perpendicular to the longitudinal direction thereof;

FIG. 10A is a side view for explaining the state in which a board is mounted on the base of the magnetic disk device according to the first embodiment of the invention;

FIG. 10B is a bottom view of the board mounted on the base;

FIG. 13A is a bottom view of the magnetic disk device of FIG. 12 with the reference head thereof inserted in the base;

FIG. 13B is a plan view of the reference head of FIG. 13A;

DESCRIPTION OF THE PREFERRED EMBODIMENTS

Before describing the preferred embodiments, an explanation will be given of the conventional magnetic disk drive shown in FIG. 1.

Figure 1:
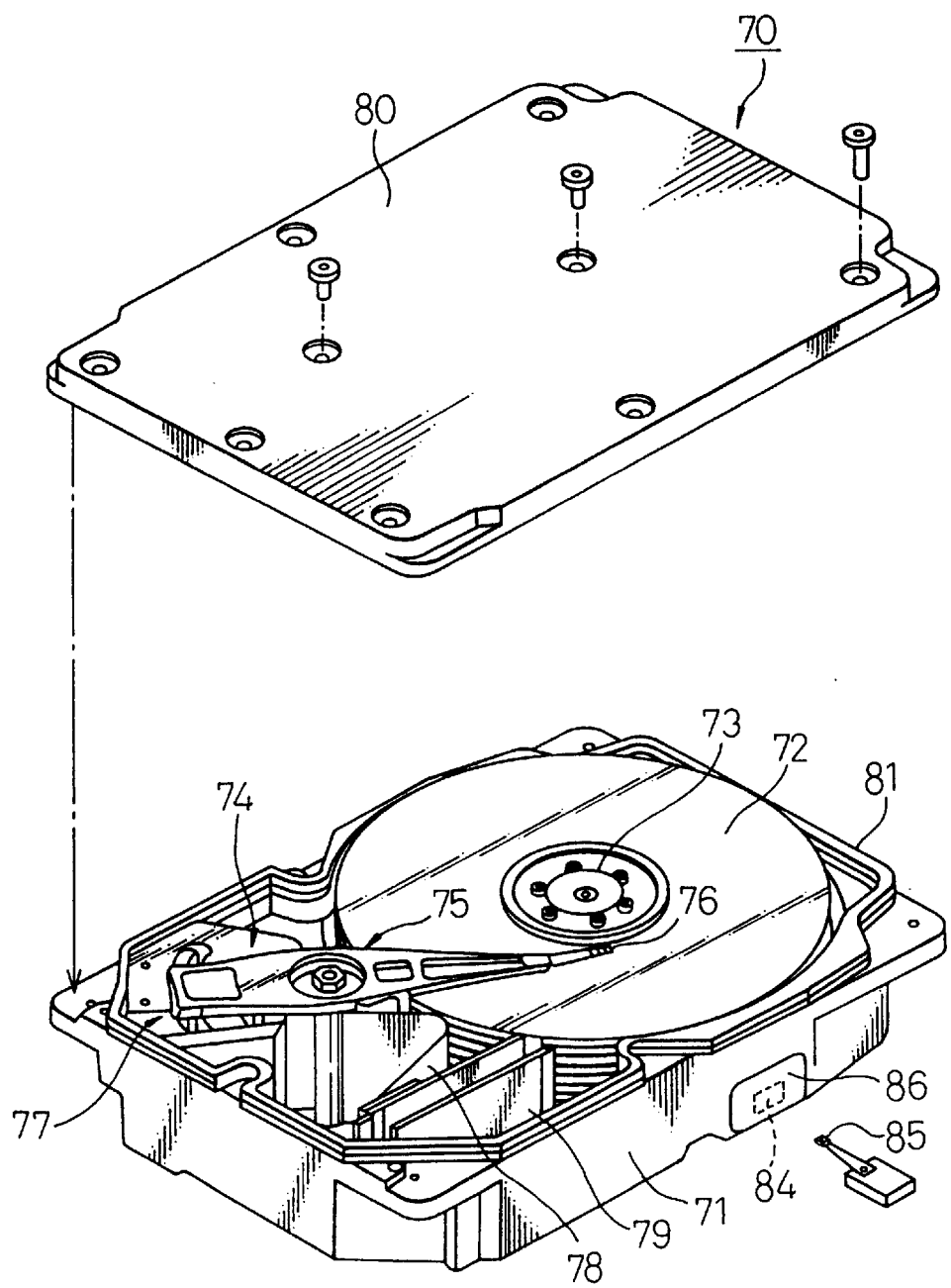
FIG. 1 is a perspective view of a conventional magnetic disk device with the cover thereof removed as viewed from the top thereof.

FIG. 1 shows an example structure of a conventional magnetic disk device 70 providing a kind of disk device. In FIG. 1, reference numeral 71 designates a base of a bath-tub type, numeral 72 a plurality of disks, numeral 73 a spindle motor for rotating the disks 72, numeral 74 an actuator including a carriage 75 with a head 76 at the forward end thereof and a voice coil motor 77, numeral 80 a cover, and numeral 81 a gasket interposed between the base 71 and the cover 80. In this magnetic disk device 70, the signal reproduced by the head 76 is withdrawn out of the actuator 74 by a flexible circuit board 78 mounted on the side of the carriage 75 and led to a fixed board 79 protruded from the bottom surface of the base 71. A head IC and a servo IC for demodulating the read signal from the head 76 are mounted on the fixed board 79.

The magnetic disk device 70 requires a process called the servo track write operation for writing servo information as a reference signal on a disk 72 at the time of manufacture thereof. This servo track write operation is performed after all the component parts are assembled in the magnetic disk device 70. The first step of servo track write operation is to insert a reference head 85 into the base 71 from outside the magnetic disk device 70 and then to write a reference signal on the outermost peripheral portion of the disk on which nothing has been written. The outermost peripheral portion of the disk into which the reference signal is written is at a position incapable of being read by the built-in head 76. The reference signal thus written is reproduced by the reference head 85 thereby to confirm the disk position, and the internal head 76 is driven by an external unit in accordance with the detected position thereby to write the servo information in the particular disk 72.

Generally, the disk 72 in which the reference signal is written is located nearest to the bottom surface of the base 71. As shown in FIG. 1, a reference head insertion hole 84 from which to insert the reference head 85 is formed in the side of the base 71. Upon completion of the servo track write operation, the reference head 85 is withdrawn out of the reference head insertion hole 84, and a seal 86 is attached to hermetically enclose the reference head insertion hole 84.

In the conventional disk device 70 shown in FIG. 1, the base 71 is vibrated by the vibrations caused when the spindle motor 73 rotates at the time of servo track write operation, thereby deteriorating the quality of the servo signal written under that condition. No conventional device is available which is capable of writing the reference signal while damping the vibrations of the disk device 70.

In the conventional magnetic disk device 70, consider a case, for example, in which the actuator 74 is placed in position on a predetermined track of a disk 72 in operation. The vibration generated by the rotation of the spindle motor 73 causes the vibration of the base 71 originated at the mounting portion thereof or causes the vibration of the base 71 due to the fact that the bottom surface of the base 71 is flat. As a result, it becomes difficult keep the actuator 74 stationary at the position where it should remain stationary and, in the worst case, the data cannot be read.

Further, with the conventional disk device 70 in operation, consider a seek operation in which the actuator 74 moves to a predetermined track of the disk 72. The base 71 is easily affected and vibrated by the reaction force of the seek operation, thereby undesirably increasing the time required for moving to a predetermined track.

An increased track pitch density is indispensable for realizing a higher capacity of the disk device in the future. The above-mentioned problems have been a major stumbling block for realizing a higher density of the track pitch.

Specific embodiments of the present invention will be described in detail below.

Figure 2A:
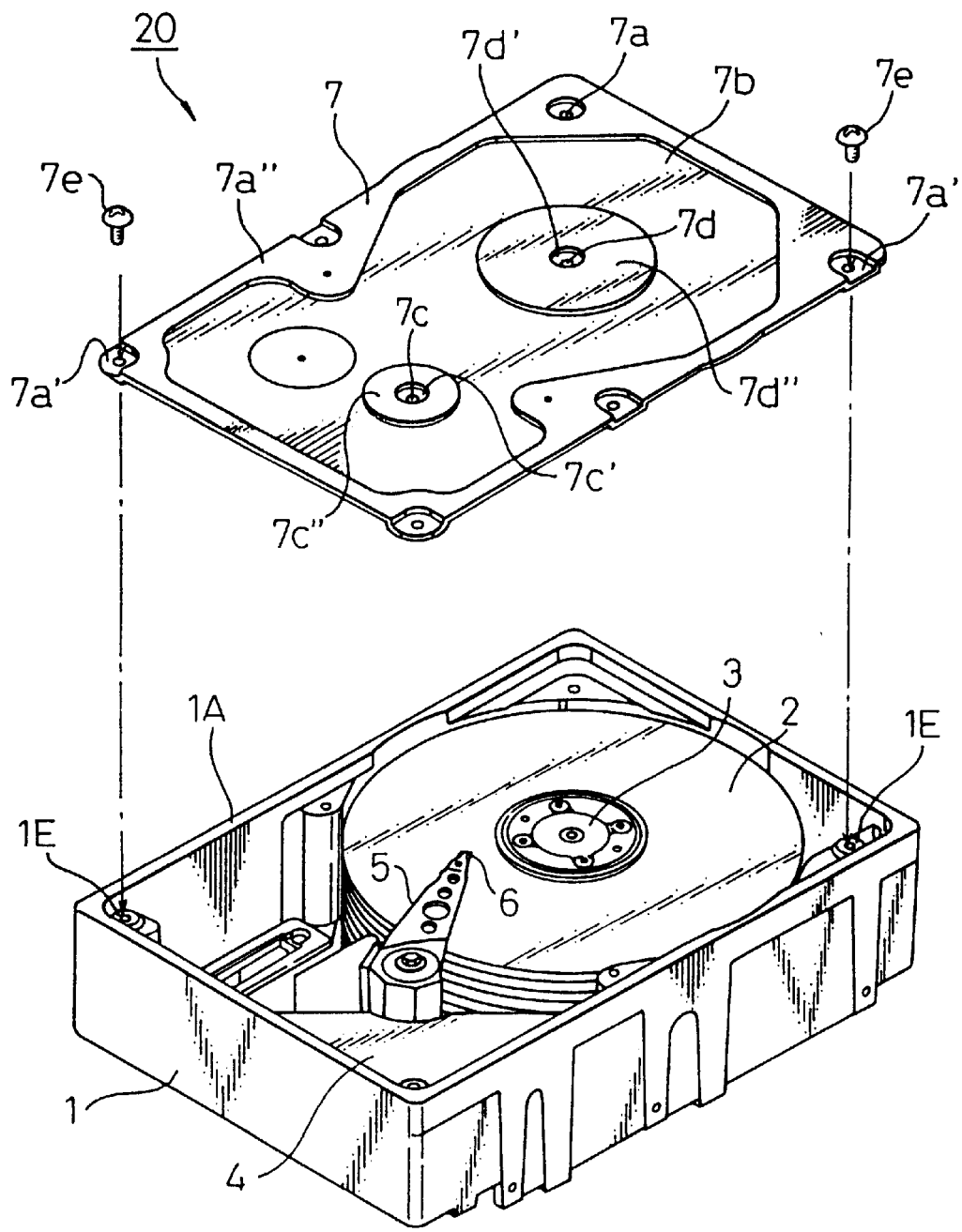
FIG. 2A is a perspective view of a magnetic disk device according to a first embodiment of the present invention with the cover thereof removed as viewed from the top thereof.
Figure 2B:
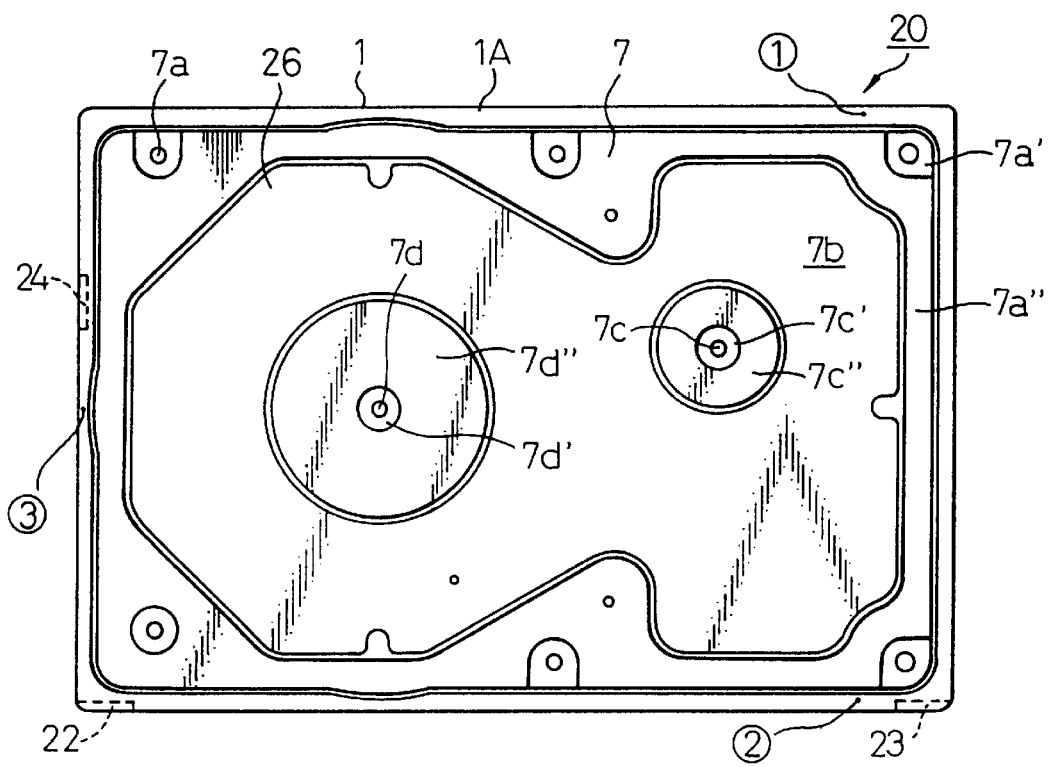
FIG. 2B is a plan view of a magnetic disk device according to the first embodiment of the invention.
Figure 2C:
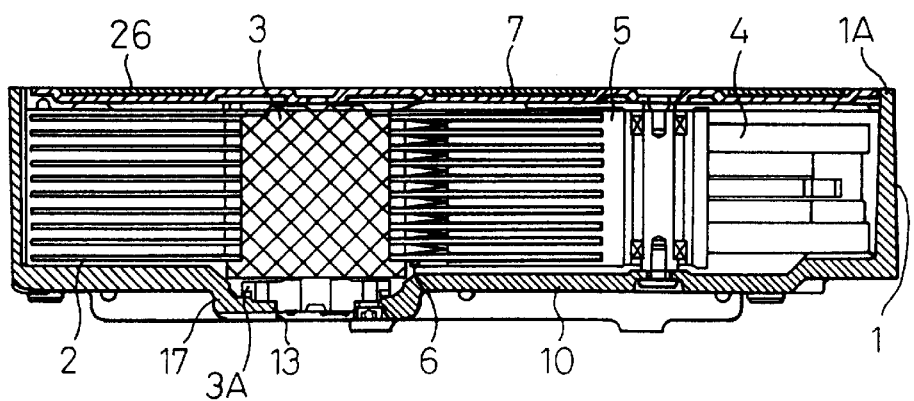
FIG. 2C is a sectional view taken in the longitudinal direction in FIG. 2B.
Figure 3:
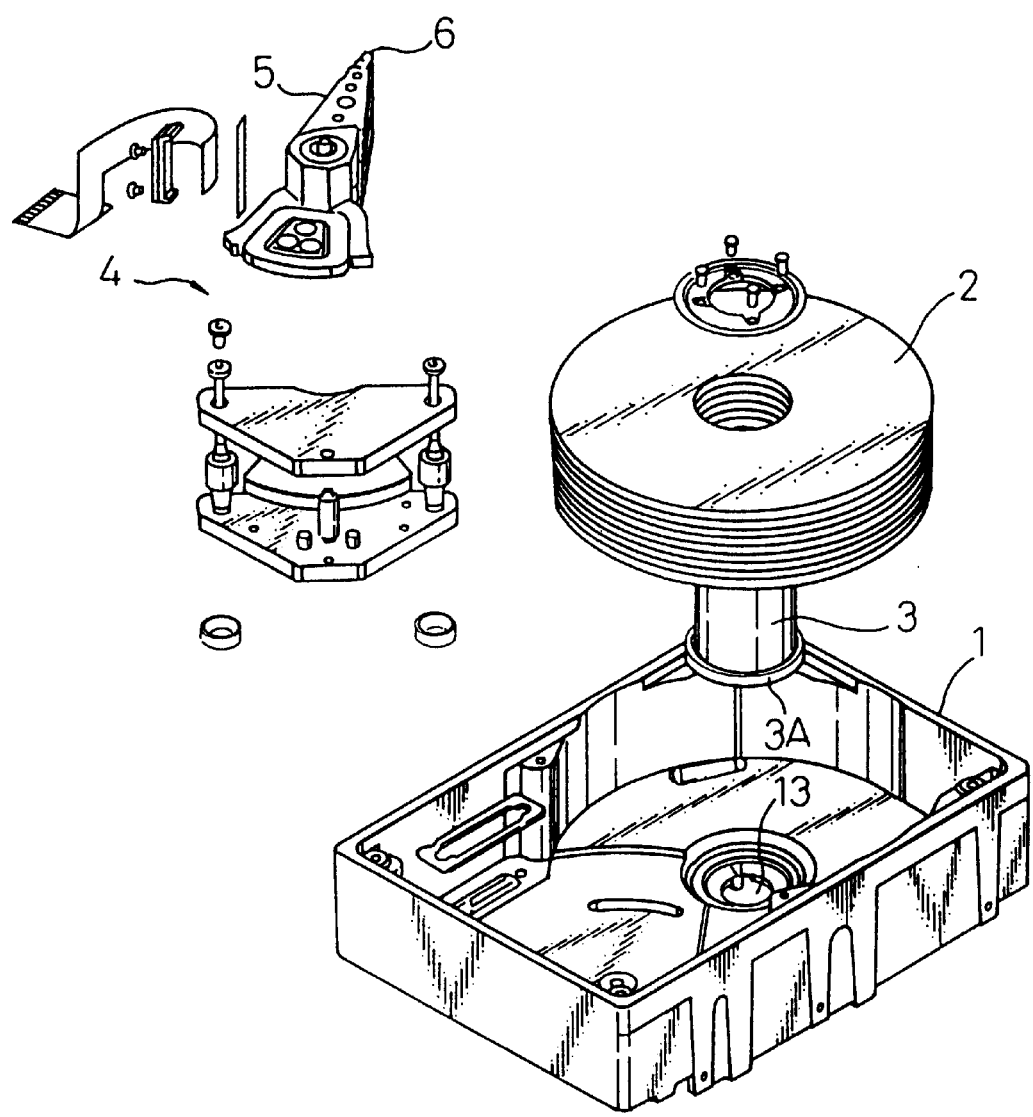
FIG. 3 is an exploded perspective view of a magnetic disk device according to the first embodiment of the invention with the cover thereof removed.

FIG. 2A is a perspective view taken from the top of a magnetic disk device 20 with a cover 7 thereof removed according to a first embodiment of the invention. FIG. 2B is a plan view of the magnetic disk device 20 of FIG. 2A with the cover 7 thereof attached thereto, and FIG. 2C is a longitudinal sectional view of the magnetic disk device 20 of FIG. 1. FIG. 3 is an exploded perspective view of the magnetic disk device 20 of FIG. 2A from which the members housed in the base 1 are taken out and shown.

As shown in FIGS. 2A, 2C and 3, the magnetic disk device 20 includes a base 1 of a bath-tub type, which accommodates therein disks 2 rotated by a spindle motor 3, a carriage 5 with a head 6 mounted thereon for writing the signal into or reading the signal from the disks 2, and an actuator 4 for driving the carriage 5. A flange 3A is disposed at the end of the spindle motor 3 near the base 1.

As shown in FIGS. 2A, 2B, the cover 7 has uneven portions formed in press. The cover 7 made of a single sheet has threaded holes 7a at or in the neighborhood of the four corners thereof, and a depression 7b at the central portion thereof. A damping plate 26 of a pressure-rolled steel sheet is attached in the depression by adhesive or sticker through a VEM (vibration energy absorbing material). The cover 7 is mounted by a screw 7e on a mounting portion 1E protruded from the inner peripheral surface of the base 1 and stepped down by more than the thickness of the cover 7 from the upper surface 1A of the base 1. Numeral 7c designates a hole for fixing the carriage, and numeral 7d a hole for fixing the spindle motor. The carriage 5 and the spindle motor 3 are fixed by screws not shown. A screw fastening portion 7d' around the fixing hole 7d is located at a level lower than a surface 7d" so that the screw head is not protruded from the surface 7d". The other portions of the cover 7 to be screwed are also formed with screw fastening portions 7a', 7c' in the depression in a similar manner such that the screw heads do not protrude from the surfaces 7a", 7c", respectively, of the cover 7. The outer profile of the cover 7 is formed smaller than the inner profile of the base 1. With the cover 7 mounted on the base 1, therefore, the upper surface 1A of the base 1 is exposed without being overlapped with the cover 7 as shown in FIG. 2B.

Numerals 22, 23, 24 in FIG. 2B designate reference surfaces described later. Numerals ①, ②, ③ designate holding portions of the upper surface 1A of the base 1 which are also described later. With the cover 7 mounted on the base 1, as shown in FIG. 2C which is a longitudinal sectional view of the device of FIG. 2B, the cover 7 is not protruded above the upper surface 1A of the base 1.

In the magnetic disk device 20 according to the first embodiment, as shown in FIGS. 2C and 3, the portion of bottom surface 10 of the base 1 in opposed relation to the flange 3A of the spindle motor 3 is expanded outside to form a base protrusion 17. The inner diameter of the base protrusion 17 has a sufficient size to accommodate the flange 3A of the spindle motor 3. In the bottom surface 10 of the base 1, therefore, it is sufficient to form a spindle motor-mounting hole 13 of such a size as to expose a minimum length of the end of the spindle motor 3 outside of the base 1. The inner diameter of the spindle motor-mounting hole 13 can thus be minimized.

Figure 4A:
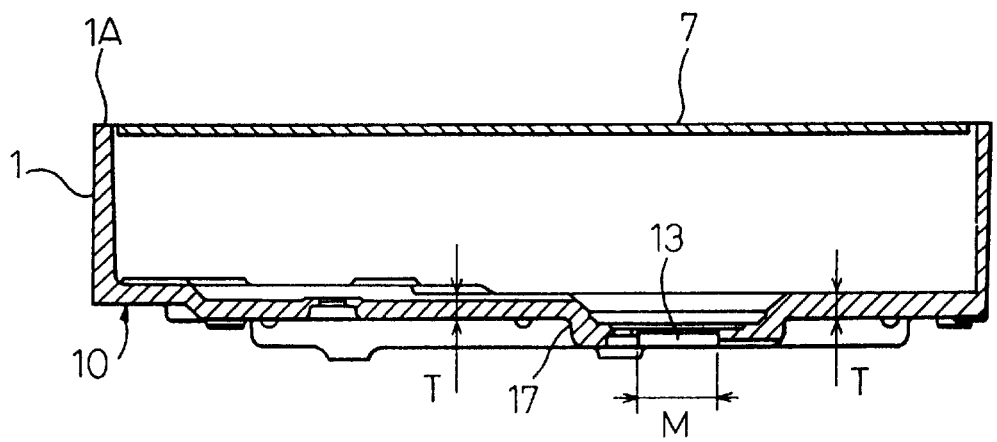
FIG. 4A is a sectional view of the base of a magnetic disk device according to the first embodiment of the invention.
Figure 4B:
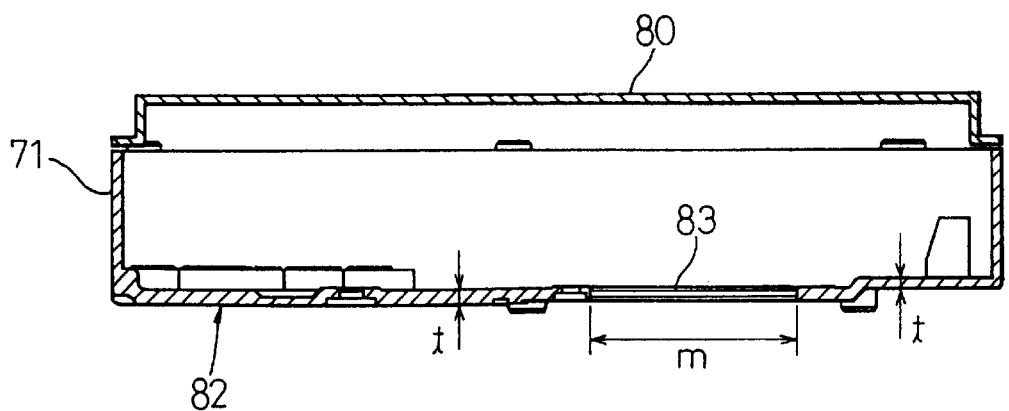
FIG. 4B is a sectional view of the base of a conventional magnetic disk device.

FIGS. 4A, 4B are sectional views showing the base of the magnetic disk 20 according to the above-mentioned embodiment as compared with the base 71 of the conventional magnetic disk device. As can be seen from FIG. 4A, the magnetic disk device 20 according to this embodiment has the protrusion 17 formed from the bottom surface 10 for accommodating the flange 3A of the spindle motor 3 shown in FIG. 3. The diameter M of the spindle motor-mounting hole 13 formed in the base 1, therefore, is comparatively small. In contrast, the bottom surface 82 of the base 71 of the conventional magnetic disk device shown in FIG. 4B is flat, and therefore a spindle motor-mounting hole 83 formed in the bottom surface 82 is required to have a larger diameter m for mounting the flange 3A of the spindle motor 3.

In the case of a 3.5-in. magnetic disk device, for example, the size of the mounting hole 13 can be not more than 13.5 mm in diameter.

Also, the thickness T of the bottom surface 10 of the base 1 of the magnetic disk device 20 according to the first embodiment is larger than the thickness t of the bottom surface 82 of the base 71 of the conventional magnetic disk device. The increased thickness T of the bottom surface 10 of the base 1 is made possible by the fact that the printed board mounted under the bottom surface 10 of the base 1 can be reduced in thickness. Specifically, the reduction in thickness of the printed board can increase the thickness T of the bottom surface 10 of the base 1 by an amount equivalent to the thickness reduction of the printed board within the same reference height. The thickness of the printed board can be reduced by an improved integration degree of the integrated circuit and the resulting decreased number of integrated circuits making it possible to mount the parts only on one side instead of on the two sides of the printed board. The printed board will be described again later.

In the case of the 3.5-in. magnetic disk device, for example, the thickness of the bottom surface 10 of the base 1 can be increased to 5 mm or more within a specified size of the base 1.

As a result, the base 1 of the magnetic disk device 20 according to the first embodiment is seen to have a smaller diameter M of the spindle motor-mounting hole 13 in the bottom surface 10 and a larger thickness T of the bottom surface 10, resulting in a higher rigidity and a larger resistance to vibrations than the conventional magnetic disk device.

Figure 5:
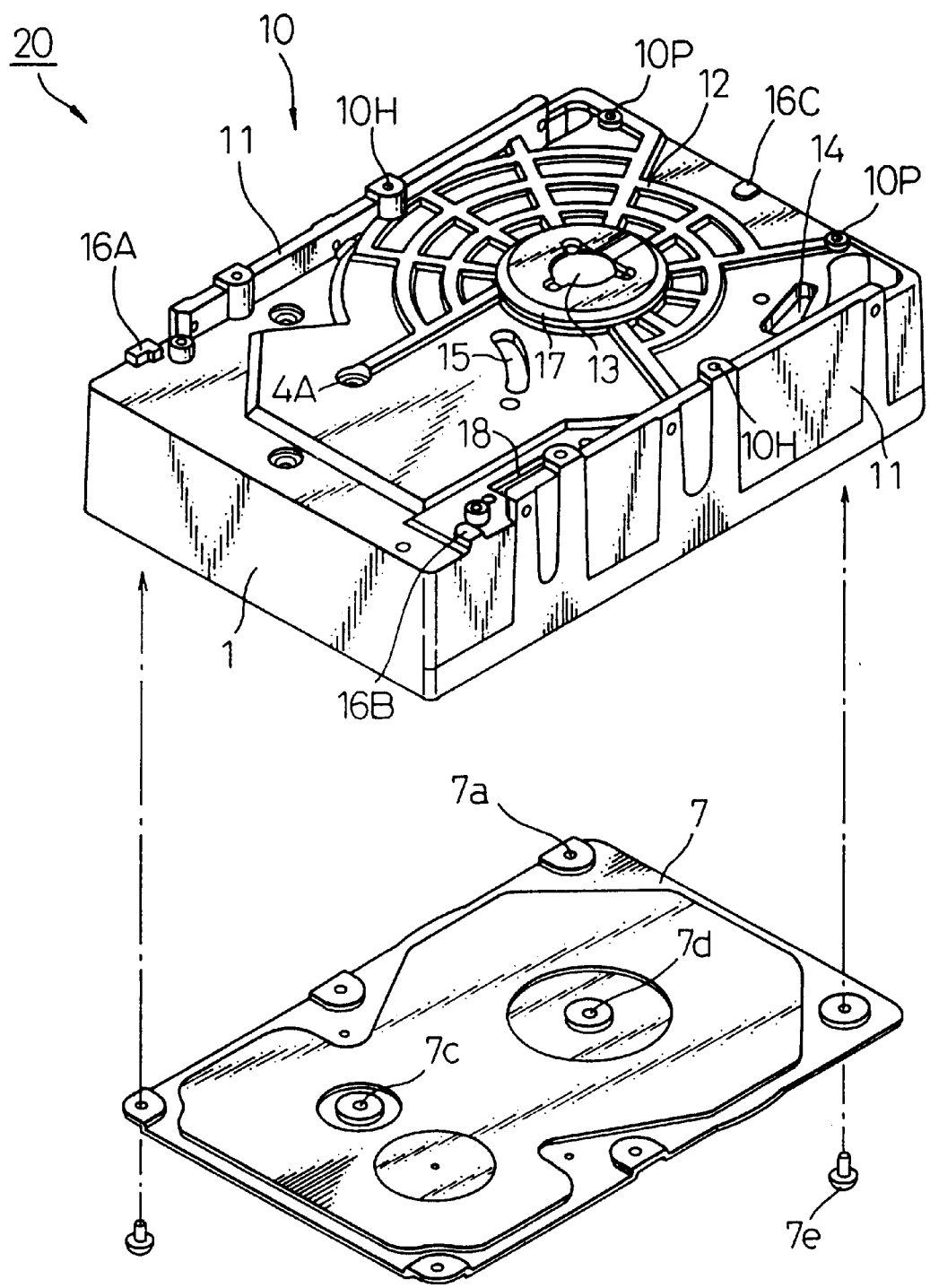
FIG. 5 is a perspective view of a magnetic disk device according to the first embodiment of the invention with the cover thereof removed.
Figure 6:
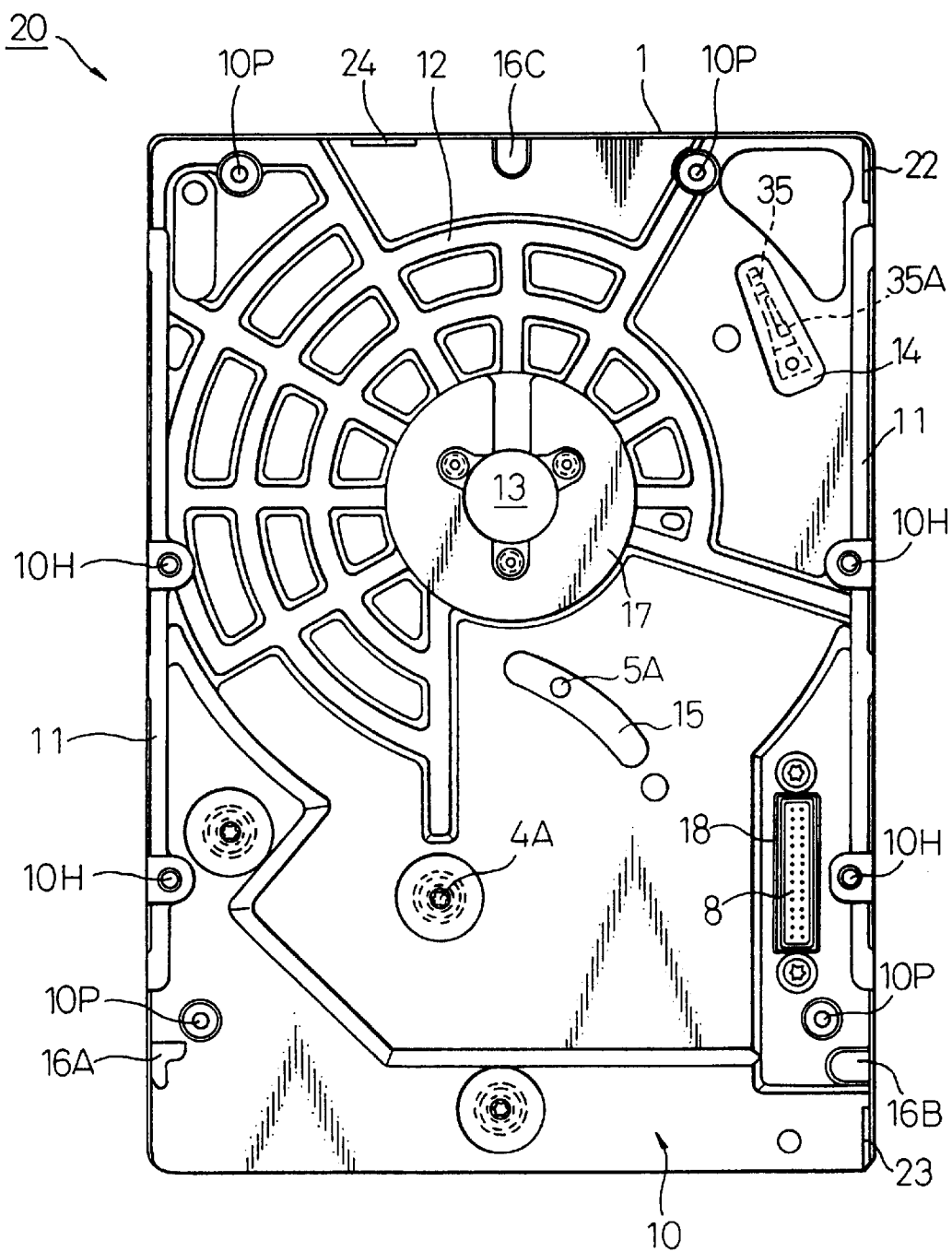
FIG. 6 is a bottom view of a magnetic disk device according to the first embodiment of the invention.

FIG. 5 is a perspective view as taken from the bottom of the magnetic disk device 20 of FIG. 1 with the cover 7 thereof removed, and FIG. 6 is a bottom view of the magnetic disk device 20.

A multiplicity of damping ribs 12 are formed on the bottom 10 of the base 1 of the magnetic disk device 20 according to this embodiment. In this embodiment, the ribs 12 are formed radially out of the outer peripheral portion of the base protrusion 17 in such a manner as to connect the outer peripheral portion of the base protrusion 17 with vibration sources on the bottom surface 1 of the base 1. The vibration sources on the base bottom 10 include, for example, a threaded hole 4A for the central shaft of the head actuator, threaded holes 10P for screwing the printed board, and threaded holes 10H for mounting the magnetic disk device 20 on an external device.

In the magnetic disk device 20 according to the first embodiment, walls 11 are formed along the longitudinal edges of the base bottom surface 10. The walls 11 are connected with the ends of several of the ribs 12 described above. Also, the threaded holes 10H for mounting the magnetic disk device 20 on an external device are formed in the bosses connected by each of the walls 11.

Further, in the magnetic disk device 20 according to the first embodiment, a reference head insertion hole 14 for inserting a reference head 35 described later into the base 1 is formed in the base bottom surface 10 but not in the side of the base. This embodiment, therefore, permits one of the walls 11 to be continuously extended to the neighborhood of the reference head insertion hole 14, and thus the walls can be formed symmetrically with each other along the two longitudinal edges of the base bottom surface 10. In view of the fact that the reference head insertion hole 14 is formed at a high-rigidity portion in the neighborhood of one of the continuous walls 11, vibrations with the reference head insertion hole 14 as nodes are rarely generated in this embodiment.

Consequently, in the magnetic disk device 20 according to the first embodiment, the rigidity of the bottom surface 10 of the base 1 is improved by the ribs 12 and the walls 11 continuously extended symmetrically with each other along the two longitudinal edges of the base bottom surface 10, thereby increasing the resistance to vibrations. Specifically, since the screwed portions are connected by each wall 11 and the ribs 12, abnormal vibrations are not easily generated. Further, the large thickness of the base bottom surface 10 as described above further improves the rigidity of the base 1.

The base bottom surface 10 according to the first embodiment described with reference to FIGS. 5 and 6 is formed with both the walls 11 and the ribs 12. Alternatively, provision of only one of them of course also improves the rigidity over the prior art.

Figure 12:
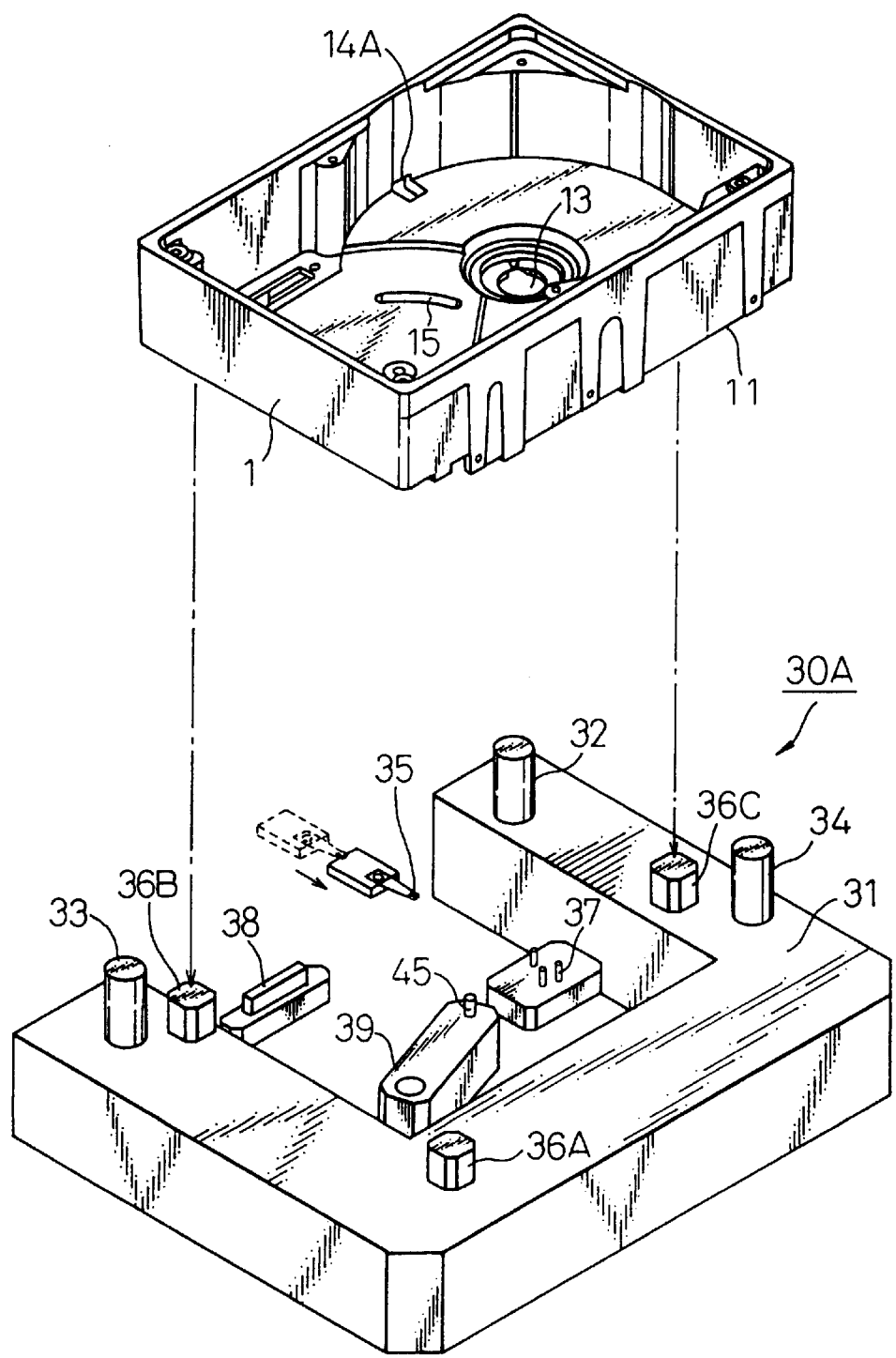
FIG. 12 is an exploded perspective view showing the state in which the magnetic disk device having a reference head insertion hole in the side thereof is being mounted on the servo track writer.

The reference head insertion hole 14A, if formed in the side of the base 1 as in the prior art, as shown in FIGS. 12 and 13A, straddles both the side and the bottom surface 10 of the base 1. As shown in FIG. 13B, a head slider 35S having the reference head 35 is mounted in a position substantially perpendicular to the longitudinal direction of the arm 35A. In such a case, one of the walls 11 is split by the reference head insertion hole 14A, thereby making it impossible to improve the rigidity of the base 1 unlike in the first embodiment. Further, in the case where the reference head insertion hole 14A is formed in the side of the base 1, the vibration of the base side having the reference head insertion hole 14 is out of phase with the vibration of the base side lacking the reference head insertion hole 14, and therefore the head in the base 1 is liable to be easily vibrated.

Now, with reference to FIGS. 6 to 9, an explanation will be given of a structure of the base 1 for preventing the vibrations of the base in the servo track write operation required at the time of manufacture of the magnetic disk device 20.

The base 1 shown in FIG. 6 includes three Z reference surfaces 16A, 16B, 16C on the bottom surface 10 thereof. The Z reference surfaces 16A, 16B, 16C have the same height from the bottom surface 10 and are positioned in the same plane. The Z reference surfaces 16A, 16B are located at positions in opposed relation to each other in the neighborhood of the longitudinal opposed sides of the base 1. The Z reference surface 16C, on the other hand, is located on a line perpendicular to and equally dividing the line connecting the Z reference surfaces 16A, 16B. Also, X reference surfaces 22, 23 are formed, respectively, at the ends of the longitudinal side of the base 1 formed with the Z reference surface 16B, at positions adjacent to the base bottom surface 10, and a Y reference surface 24 is formed at a position adjacent to the base bottom surface 10 on the side of the base 1 having the Z reference surface 16C. The X reference surfaces 22, 23 and the Y reference surface 24 are perpendicular to the base bottom surface 10.

Figure 7:
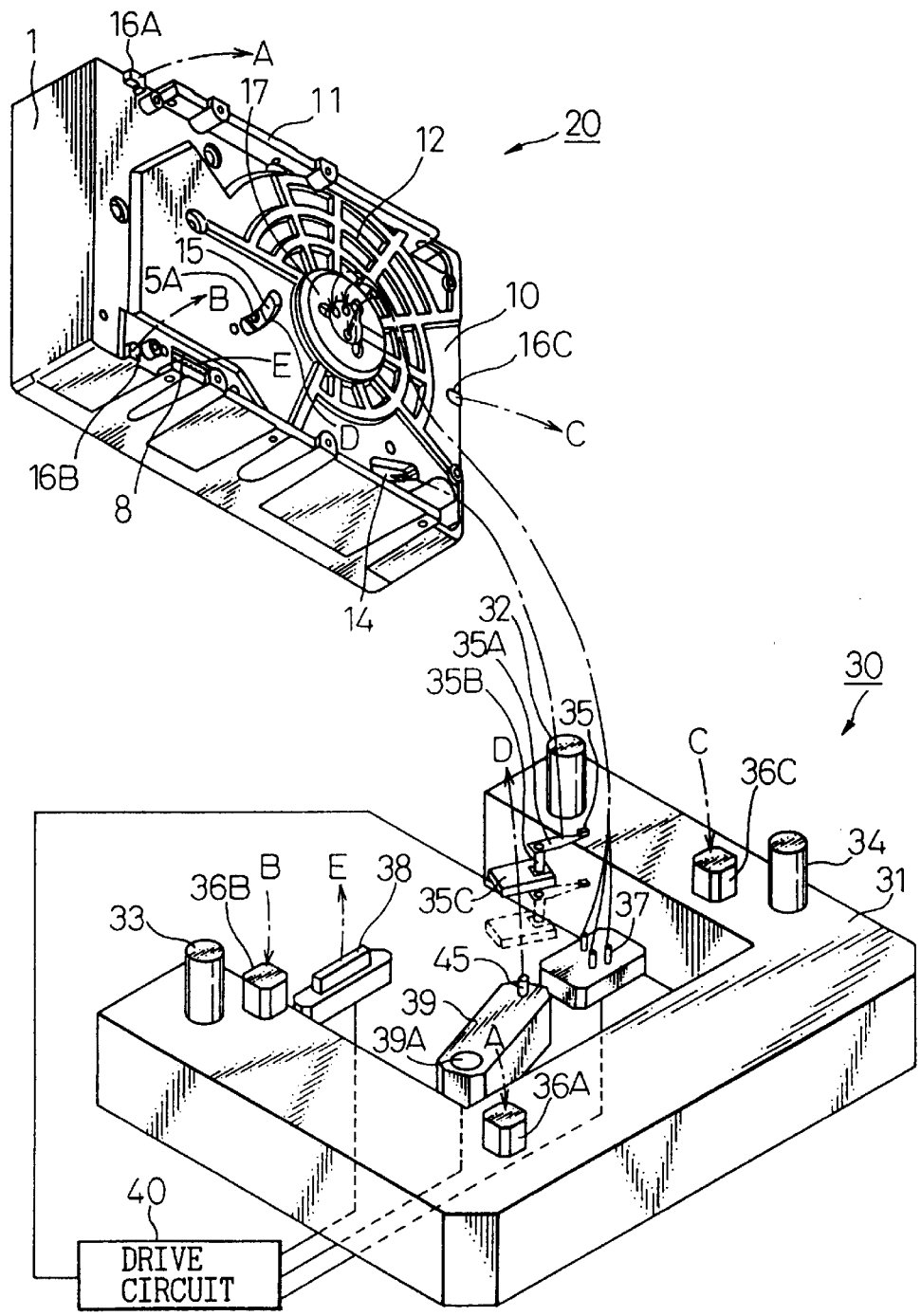
FIG. 7 is an exploded perspective view of a magnetic disk device according to the first embodiment being mounted on a servo track writer.

FIG. 7 shows the manner in which the magnetic disk device 20 having the bottom surface 10 as shown in FIG. 6 is mounted on a servo track writer 30 providing a write jig for the reference signal.

The servo track writer 30 has a substantially channel-shaped pedestal 31, from which three cylindrical studs 32, 33, 34 and three prismatic Z reference rests 36A, 36B, 36C are protruded. As shown in FIG. 8A, the three cylindrical studs 32, 33, 34 are arranged at positions corresponding to the positions of the reference surfaces 22, 23, 24, respectively, described with reference to FIG. 6. Specifically, the stud 32 is associated with the X reference surface 22, the stud 33 is associated with the X reference surface 23, and the stud 34 is associated with the Y reference surface 24. The Z reference rests 36A, 36B, 36C have the uppermost surfaces thereof in the same plane and, as shown in FIG. 7, are located at the positions of the Z reference surfaces 16A, 16B, 16C, respectively, on the base bottom surface 10.

The internal space of the pedestal 31 of the servo track writer 30 has mounted therein a reference head 35, spindle motor contact pins 37, a connector contact pin 38 and a swing arm 39 with a positioning pin 45. The spindle motor contact pins 37, the connector contact pin 38 and the swing arm 39 with the positioning pin 45 are connected to a drive circuit 40. Actually, however, a drive mechanism not shown is inserted between each of the reference head 35, the connector contact pin 38 and the positioning pin 45 on the one hand and the drive circuit 40 on the other.

The reference head 35 is mounted at the forward end of the arm 35A, which in turn is mounted on a movable table 35C by a support 35B. The movable table 35C is connected to the drive circuit 40, and with the magnetic disk device 20 placed on the pedestal 31 of the servo track writer 30, is adapted to move up to the position indicated by solid lines from the position indicated by dotted lines. With the rise of the movable table 35C up to the position indicated by solid lines, the arm 35A and the reference head 35 proceed into the base 1 by way of the reference head insertion hole 14 formed in the base bottom surface 10 as shown in FIG. 6, so that the reference head 35 becomes ready for writing or reading the reference signal into or from the outermost peripheral portion of the disk in the base 1.

With the magnetic disk device 20 mounted on the pedestal 31 of the servo track writer 30, the spindle motor contact pins 37 come into contact with the terminals at the end of the spindle motor exposed from the spindle motor mounting hole 13 formed in the protrusion 17 of the base bottom surface 10. The spindle motor contact pins 37 are for applying a signal for rotating the spindle motor when the magnetic disk device 20 is mounted on the base portion 31 of the servo track write 30.

With the magnetic disk device 20 mounted on the base portion 31 of the servo track writer 30, the connector contact pin 38 comes into contact with the pins (see FIG. 6 for details) of the connector 8 exposed from the connector mounting hole 18 of the base bottom surface 10. The connector 8 is connected to as many heads mounted on the carriage in the base 1 as there are disk surfaces. The signal input through the connector 8 from the drive circuit 40 is written into each disk surface from each head as a servo signal.

With the magnetic disk device 20 mounted on the pedestal 31 of the servo track writer 30, the positioning pin 45 protruded from the swing arm 39 proceeds into the base 1 by way of the positioning pin insertion hole 15 of the base bottom surface 10, and comes to engage a drive hole 5A (see FIG. 6) formed in the bottom of the carriage in the base 1. Also, the axial line of the rotative shaft 39A of the swing arm 39 coincides with the axial line of the rotative shaft of the actuator. When the swing arm 39 is swung by the drive circuit 40 with the positioning pin 45 in mesh with the drive hole 5A, therefore, the carriage swings in the same manner as if driven by the actuator.

FIGS. 8A, 8B, 8C are diagrams for explaining the manner in which the base 1 of the magnetic disk device 20 is firmly fixed in horizontal direction (X-Y direction) after the magnetic disk device 20 is mounted on the servo track writer 30 shown in FIG. 7. When the magnetic disk device 20 is mounted on the servo track writer 30 with the X reference surface 22 on the base 1 brought into contact with the stud 32, with the X reference surface 23 brought into contact with the stud 33 and the Y reference surface 24 brought into contact with the stud 34, then the side of the magnetic disk device 20 far from the side thereof having the X reference surfaces 22, 23 is pressed by the X damper 43 providing a holding member, while the side of the magnetic disk device 20 far from the side having the Y reference surface 24 is pressed by the Y clamper 44 providing another holding member. The position pressed by the X damper corresponds exactly to the intermediate point between the X reference surfaces 22 and 23, while the position pressed by the Y damper is in opposed relation with the Y reference surface 24. Also, the X reference surfaces 22, 23 and the Y reference surface 24 are located beside the thick portion of the bottom surface 10 of the base 1, and so are the positions pressed by the X damper 43 and the Y damper 44. Thus, the base 1 is firmly fixed in a position resistant to vibrations with the thick portion thereof in an energized state. The drive mechanisms for the X damper 43 and the Y damper 44 are not shown.

As described above, the base 1 of the magnetic disk device 20 is accurately and firmly fixed in X-Y direction by the two dampers 43, 44 with the X reference surfaces 22, 23 and the Y reference surface 24 kept in contact with the three studs 32, 33, 34, respectively, thus increasing the resistance to vibration.

Figure 9A:
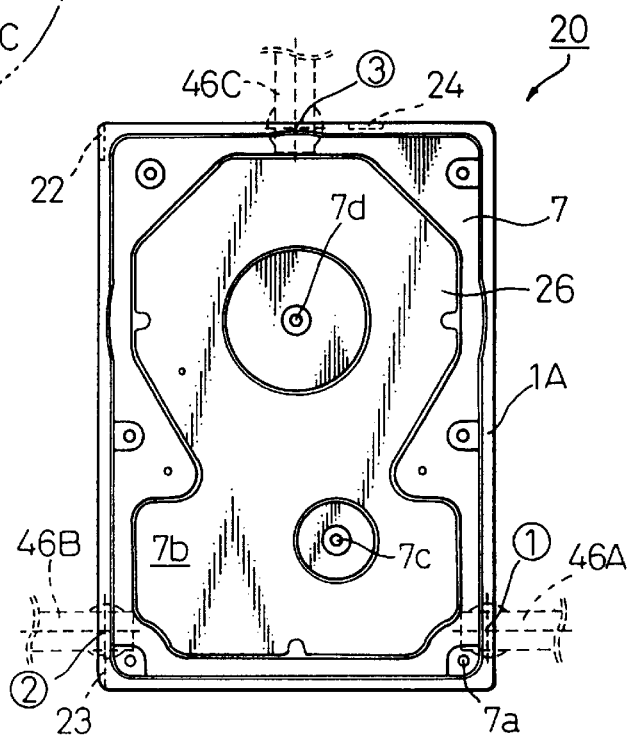
Figure 9B:
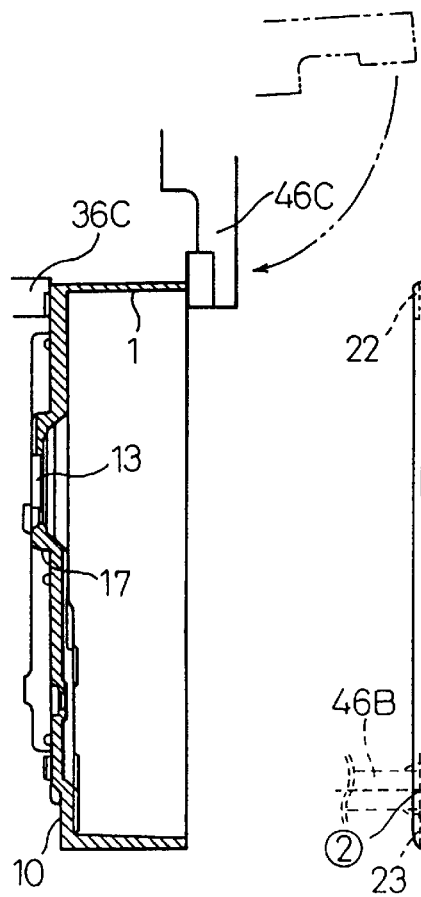
Figure 9C:
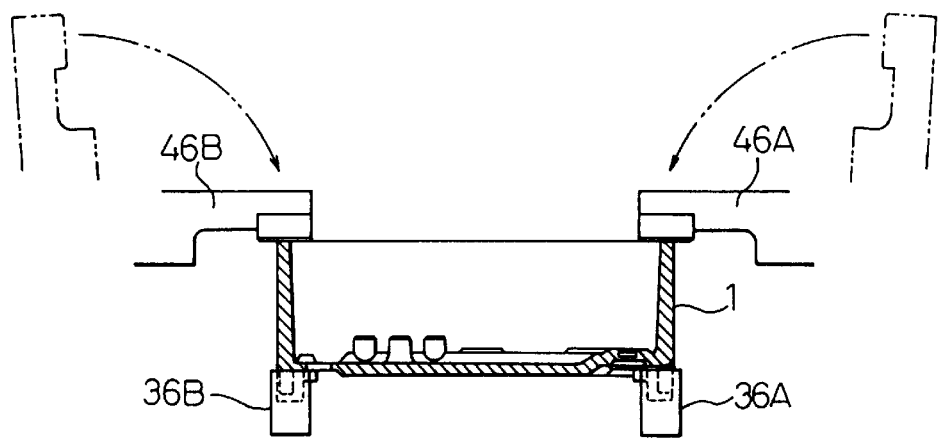

FIGS. 9A, 9B, 9C are diagrams for explaining the manner in which the base 1 of the magnetic disk device 20 is firmly fixed in vertical direction (Z direction) after the magnetic disk device 20 is mounted on the servo track writer 30 shown in FIG. 7. When the three Z reference surfaces 16A, 16B, 16C arranged on the bottom surface 10 of the base 1 are placed on the Z reference rests 36A, 36B, 36C, respectively, of the servo track writer 30, the holding portions ①, ②, ③ on the upper surface 1A of the base 1 described with reference to FIG. 2B are pressed by the holding members 46A, 46B, 46C, respectively. The holding portions ①, ②, ③ on the upper surface 1A of the base 1 are located just above the three Z reference surfaces 16A, 16B, 16C, respectively. As described above, the cover 7 never protrudes above the upper surface 1A of the base 1, and therefore the upper surface 1A of the base 1 is securely held by the holding members 46A, 46B, 46C. As a result, the base 1 has each side thereof held in a straight line in the Z direction by the Z reference rests 36A, 36B, 36C and the holding members 46A, 46B, 46C on the base 31 of the servo track writer 30. The base 1 thus is firmly fixed in a manner highly resistant to vibrations. The drive mechanisms for the holding members 46A, 46B, 46C are not shown.

In this way, the base 1 of the magnetic disk device 20 is held in the Z direction by the three holding members 46A, 46B, 46C, with the three Z reference surfaces 16A, 16B, 16C mounted on the Z reference rests 36A, 36B, 36C, respectively. Consequently, the magnetic disk device 20 is accurately and firmly fixed in the Z direction in a manner highly resistant to vibration.

At the time of a servo track write operation, as described with reference to FIGS. 8A to 8C and 9A to 9C, the magnetic disk device 20 is placed on the servo track writer 30 with the base 1 thereof accurately and firmly fixed in each of X, Y and Z directions. Under this condition, the spindle motor contact pins 37 come into contact with the terminals of the spindle motor, the connect contact pin 38 also comes into contact with the connector 8, and the positioning pin 45 is in mesh with the carriage drive hole 5A.

In the first state, the spindle motor in the base 1 is rotated first of all. Then, the movable table 35C is moved up to the position indicated by solid lines from the position indicated by dotted lines by the drive circuit 40 described with reference to FIG. 6, and the reference signal is written from the reference head 35 into the outermost peripheral portion of a disk in the base 1. The reference signal thus written into the uppermost peripheral portion of the disk is read by the reference head 35 thereby to detect the disk position.

Upon detection of the disk position, the swing arm 39 having the positioning pin 45 in mesh with the drive hole 5A is swung by the drive circuit 40, so that the carriage moves to set each head 6 in position on each disk. The servo signal thus is written into each disk. In the servo track write operation, since the spindle motor is rotated while the carriage is driven by an external source, the base 1 contains a source of vibration. In the magnetic disk device 20 according to this embodiment, however, the base 1 thereof is firmly fixed on the servo track writer 30 in X, Y and Z directions as described above, and in addition, the base 1 is protected by various damping means. As a result, the vibration of the base 1 at the time of servo track write operation is considerably reduced for an improved writing accuracy.

Also, according to the first embodiment, as shown in FIG. 7, the drive mechanism for the reference head 35 can be arranged under the servo track writer 30, and therefore the area occupied by the servo track writer 30 can be reduced for an improved space utilization rate. In the case where the reference head insertion hole 14 is not formed in the base bottom surface 10 but in the side of the base 1 like the reference head insertion hole 14A, on the other hand, the drive mechanism for the reference head 35 is unavoidably arranged beside the servo track writer 30A, as shown in FIG. 12, thereby increasing the area occupied by the servo track writer 30A. The configuration of the conventional servo track writer 40A shown in FIG. 12 is identical to that of the servo track writer 40 described with reference to FIG. 7 except for the driving unit for reference head 35. The same component members, therefore, are designated by the same reference numerals, respectively, and will not be described in detail again.

FIG. 10A is a diagram for explaining the manner in which a printed board 9 carrying the parts constituting the drive circuit 40 described with reference to FIG. 7 is mounted on the base 1 of the magnetic disk device 20 configured as described above. FIG. 10B is a bottom view of the printed board 9.

Figure 11A:
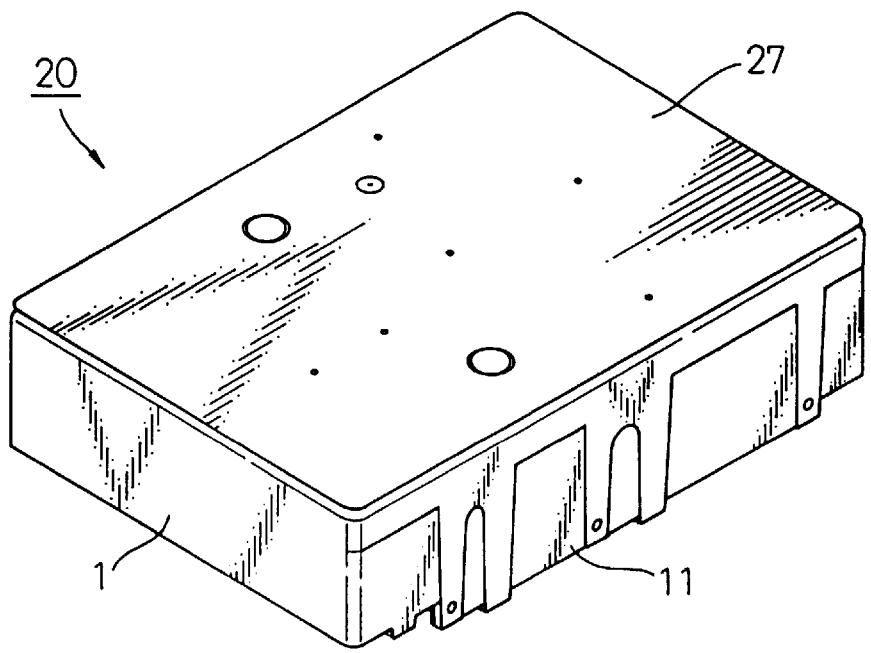
FIG. 11A is a perspective view as taken from the top of a magnetic disk device according to the first embodiment of the invention including a damping plate mounted on the upper side thereof.
Figure 11B:
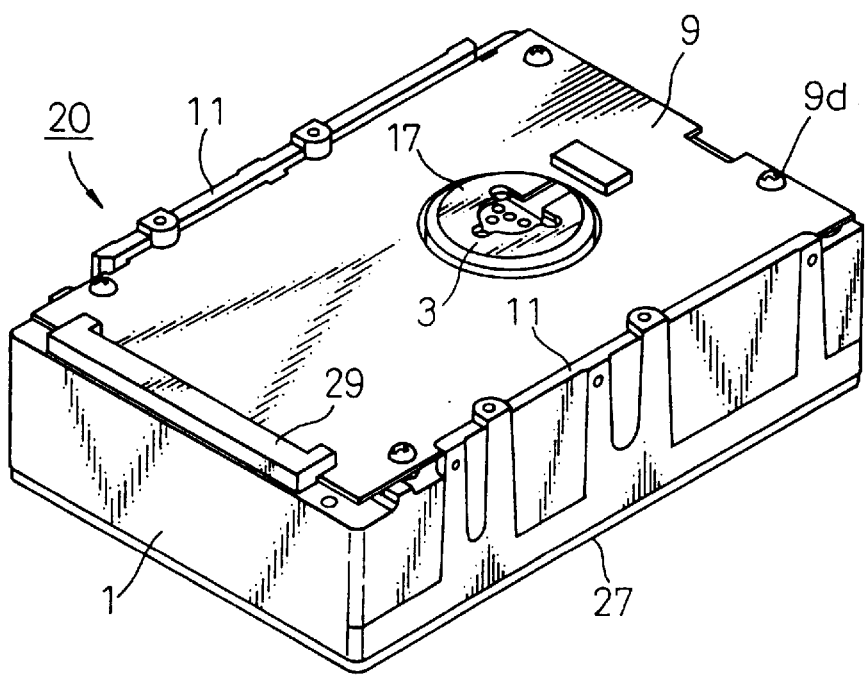
FIG. 11B is a perspective view as taken from the reverse side of the magnetic disk device on which the board is mounted.

The printed board 9 has, formed at the edges thereof, threaded holes 9a corresponding to the threaded holes 10P for holding the printed board described with reference to FIG. 6 and also an insertion hole 9b for receiving the base protrusion 17. Also, a connector 26 for driving the spindle motor is mounted on the bottom of the printed board 9, a read/write connector 28 connected to a connector 8 (FIG. 6) exposed to the reverse side of the base 1 is mounted on the upper surface of the printed board 9, and an interface connector 29 is mounted at an end of the printed board 9. The circuit parts making up the drive circuit 40 shown in FIG. 7 are mounted on the upper surface of the printed board 9 and are not shown. FIG. 11B is a view taken from the reverse side of the magnetic disk device 20 with the printed board 9 mounted thereon.

The magnetic disk device 20 according to the first embodiment further includes an aluminum seal 27 mounted on the damping plate 26 on the upper surface of the base 1 shown in FIG. 2 for further reducing the vibrations at the time of mounting the magnetic disk device on an external device.

In the magnetic disk device 20 according to the first embodiment described above, (1) the height of the printed board 9 is reduced to increase the thickness of the bottom surface 10 of the base 1;
(2) the portion of the base 1 corresponding to the flange 3A of the spindle motor 3 is formed with the protrusion 17 for reducing the diameter of the mounting hole 13 in the base 1 of the spindle motor 3;
(3) the ribs 12 connected to the vibration sources are formed on the bottom surface 10 of the base 1;
(4) the bottom surface 10 of the base 1 is formed with the reference head insertion hole 14 to eliminate the need of a side hole;
(5) the continuous walls 11 are formed along the longitudinal edges, respectively, of the bottom surface 10 of the base 1;
(6) the reference surfaces 22 to 24 for attenuating the horizontal vibrations at the time of servo track write operation are arranged on the sides of the base 1, and are firmly fixed by the studs 32 to 34 and the dampers 43, 44; and
(7) the reference surfaces 16A to 16C for reducing the vertical vibrations at the time of servo track write operation are arranged on the bottom surface 10 of the base 1, and the holding points ①to ③are provided on the upper surface 1A, thereby making it possible to firmly fix the magnetic disk device 20 by means of the reference rests 36A to 36C and the holding members 46A to 46C. Provision of these damping means improves the rigidity of the base 1 and increases the strength against vibrations. Even when the track pitchs is increased in density on the disks 1, therefore, the accuracy and reliability of signal read and write operation is improved.

As far as any one of the damping means of (1) to (7) described above is provided for the magnetic disk device 20, the rigidity of the base 1 of each magnetic disk device will be correspondingly increased. By combining a plurality of the above-mentioned protective means as required, however, the rigidity of the base 1 is further improved.

Figure 14A:
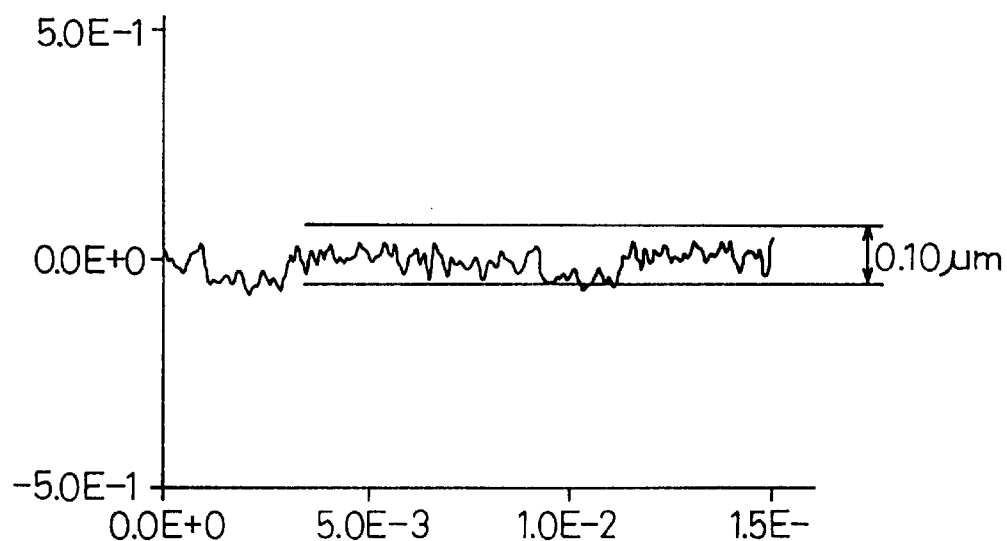
FIG. 14A is a time chart showing the servo signal quality for the base according to this invention.
Figure 14B:
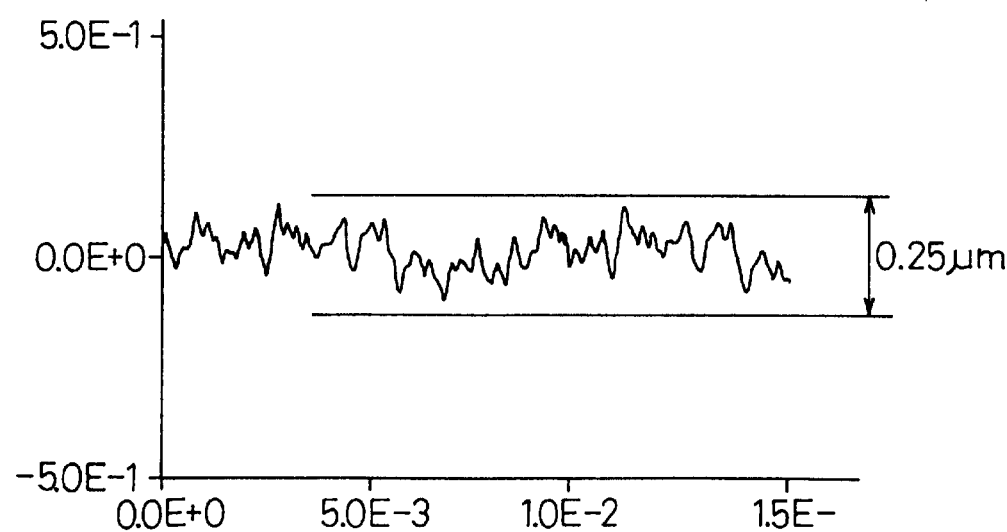
FIG. 14B is a diagram showing the servo signal quality for a conventional base.

As a specific example, FIG. 14 shows the result of comparison of the servo signal quality between the base 1 according to the invention and the conventional base 70 with which the servo signal is written in a given track. FIG. 14a shows the servo signal quality for the base 1 according to the invention, and FIG. 14b the servo signal quality for the conventional base 70.

The graphs shown in FIGS. 14A, 124B indicate the error value of the servo signal written in the disk and read out by the head of the apparatus. The abscissa represents the time, and the ordinate represents the error value along the track. The data is an average value for 128 passes over a predetermined track on which the head is placed. From these diagrams, it can be seen that the error value for the conventional base 70 is about 0.25 $\mu$m in terms of the value (P—P value) between the upper peak and the lower peak. The corresponding error value for the base 1 according to the present invention, on the other hand, is about 0.10 $\mu$m, thus indicating a considerable improvement.

This effect makes it possible for the housing structure of the disk device according to the first embodiment to have a high density track pitch without adversely affecting the reliability.

The first embodiment was explained above with reference to a housing structure of the magnetic disk device 20. The housing structure according to the invention, however, is equally applicable to a magneto-optic disk device.

Figure 15A:
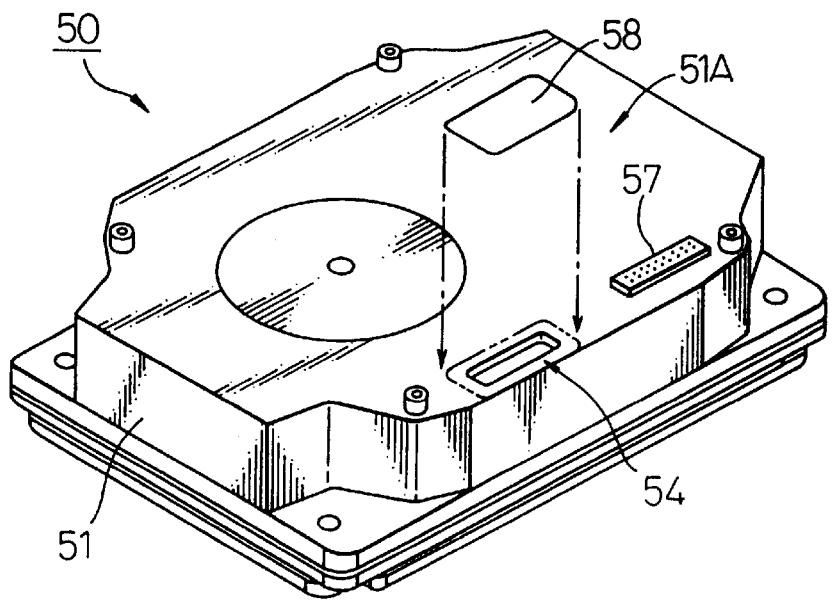
FIG. 15A is a perspective view as taken from the base of a magnetic disk device according to a second embodiment of the invention.

FIG. 15A is a diagram showing the magnetic disk device 50 according to the second embodiment as viewed from the base 51 side thereof. Also in the magnetic disk device 50 according to the second embodiment, a reference head insertion hole 54 identical to the reference head insertion hole 14 described in the first embodiment is formed in the bottom surface 51A of the base 51.

Figure 15B:
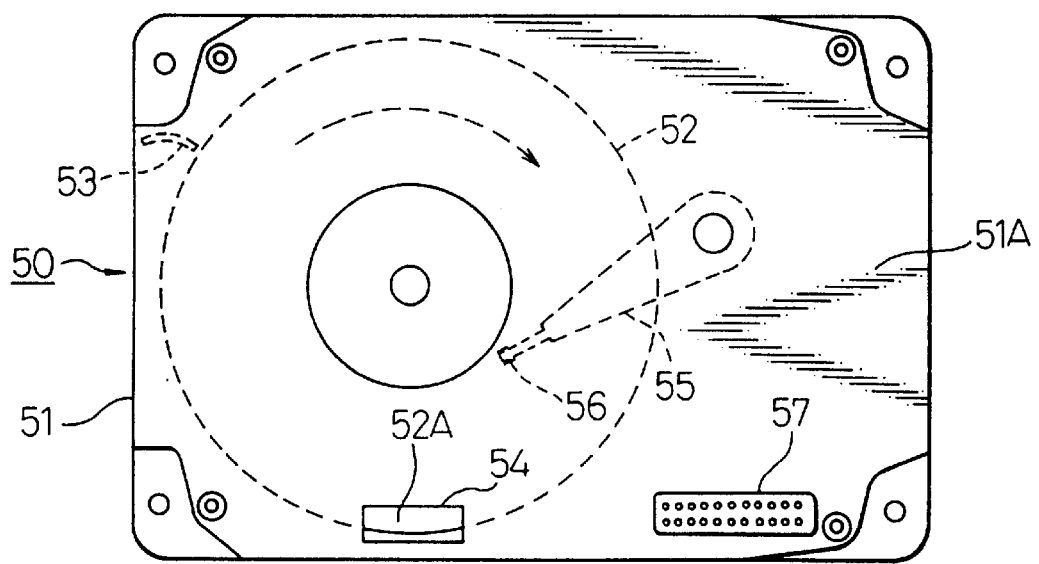
FIG. 15B is a bottom view of the magnetic disk device shown in FIG. 15A.

According to the second embodiment, the position where the reference head insertion hole 54 is formed represents the outermost peripheral portion 52A of the disk 52 downstream in the direction of rotation of the disk 52 with respect to the position of the read/write head 56 arranged at the forward end of the carriage 55 of the disk device 50, as shown in FIG. 15B. The position where the reference head insertion hole 54 is formed according to the second embodiment, on the other hand, is a predetermined distance away from the circulation filter 53 in the disk device 50. Further, the position where the reference head insertion hole 54 according to the second embodiment is formed is on the same side as the connector 57 of the read/write cable led out of the base 51 with respect to the longitudinal center line of the disk device 50.

The reason why the reference head insertion hole 54 is formed in the outermost peripheral portion 52A of the disk 52 as described above is that, in the case where a 30-MHz clock signal is written as a reference signal, for example, the fact that the length of an outer arc is larger than that of an inner arc can suppress the angular error for an improved positioning accuracy. Further, as a result of arranging the reference head insertion hole 54 on the same side as the connector 57, the access point of the servo track writer is also on the same side, and therefore a compact servo track writer is realized.

Also, the reference head insertion hole 54 is enclosed by the seal member 58, as shown in FIG. 15A, after the reference signal is written in the disk 52 by the servo track writer described above. A material capable of shielding electromagnetic waves from an external source, such as a metal foil can be used, for example, as the material of the seal member 58. This seal member 58 is used also for the reference head insertion hole 14 of the magnetic disk device 20 according to the first embodiment described above.

Figure 16A:
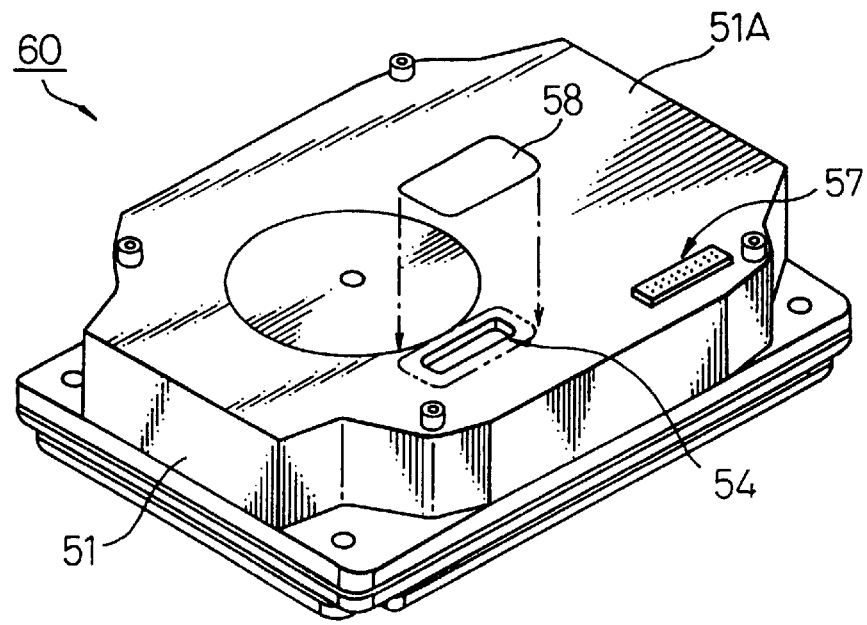
FIG. 16A is a perspective view as taken from the base of a magnetic disk device according to a third embodiment of the invention.
Figure 16B:
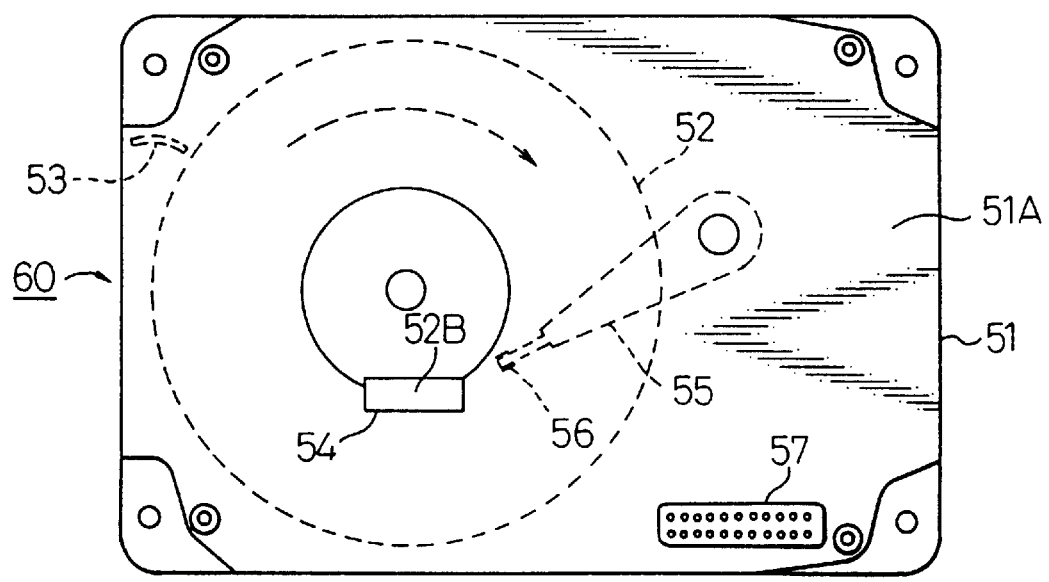
FIG. 16B is a bottom view of the magnetic disk device shown in FIG. 16A.

FIGS. 16A, 16B show a configuration of the magnetic disk device 60 according to a third embodiment of the invention. This configuration of the magnetic disk device 60 according to the third embodiment includes the same component parts as the magnetic disk device 50 according to the second embodiment of the invention described with reference to FIGS. 15A, 15B, except for the position where the reference head insertion hole 54 is formed. Therefore, the component parts of this embodiment identical to the corresponding ones of the magnetic disk device 50 according to the second embodiment will be designated by the same reference numerals, respectively, in the description that follows.

Also in the magnetic disk device 60 according to the third embodiment, the reference head insertion hole 54 is formed in the bottom surface 51A of the base 51. The third embodiment is different from the second embodiment in that the reference head insertion hole 54 is formed in the innermost peripheral portion 52B of the disk 52 downstream in the rotational direction of the disk 52 with respect to the position of the read/write head 56 at the forward end of the carriage 55 of the disk device 50.

The reference head insertion hole 54 is formed in the innermost peripheral portion of the disk 52 as described above in the case where the rotational speed of the disk 52 of the magnetic disk device is high. For the disk device having a high rotational speed of the disk 52, the deflection (waviness) of the inner portion of the disk 52 is larger than that of the outer portion of the disk 52. Provision of the reference head on the inner side of the disk 52, therefore, is more advantageous for suppressing the positioning error due to the deflection.

The magnetic disk device 60 according to the third embodiment is the same as the magnetic disk device 50 according to the second embodiment in that the reference head insertion hole 54 is formed at a point distant by a predetermined length from the circulation filter 53 in the disk device 60 and in that the reference head insertion hole 54 is arranged on the same side as the connector 57 of the read/write cable withdrawn from the base 51 with respect to the longitudinal center line of the magnetic disk device 60. Further, according to the third embodiment, the reference head insertion hole 54 is enclosed by the seal member 58 capable of shielding external electromagnetic waves after the reference signal is written in the disk 52.

The reason why the reference signal is written in the outermost peripheral portion or the innermost peripheral portion of the disk 52 as described above will be described below. Specifically, the reference signal which is written on the disk 52 is required to be written outside the data write zone of the disk 52. If the reference signal is written in the data write zone of the disk 52, the data write zone would be split into halves by the reference signal, with the result the sequential read/write operation would have to jump the track (cylinder) where the reference signal is written and consume extra time. In order to avoid this time loss, the reference signal is written in the outermost peripheral portion or in the innermost peripheral portion outside the data write zone of the disk 52.

The dust generated between the reference head and the disk 52 or the dust that has intruded by way of the reference head insertion hole 54 moves across the disk under the centrifugal force of the disk 52 in rotation. In the case where the reference head or the reference head insertion hole 54 is located in the vicinity of the circulation filter 53, the dust would pass through the circulation filter 53 before leaving the disk 52 and would circulate within the device. According to the present invention, however, the circulation filter 53 is located a distance away from the reference head insertion hole 54, and therefore the dust circulates along the outer periphery of the disk 52 and can be caught by the circulation filter 53.

Figure 17A:
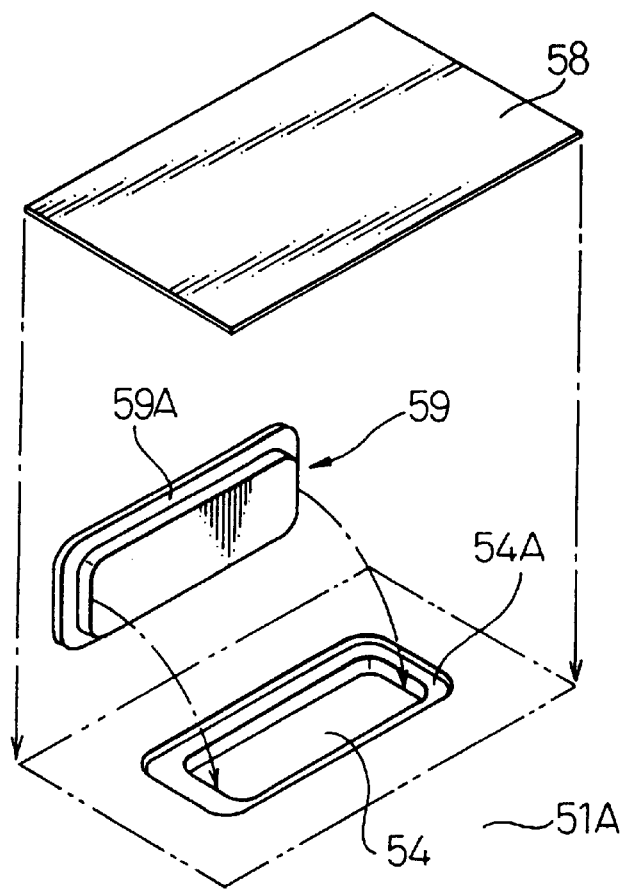
FIG. 17A is a perspective assembly view showing a method of sealing the reference head insertion hole of a magnetic disk device according to another embodiment of the invention.
Figure 17B:
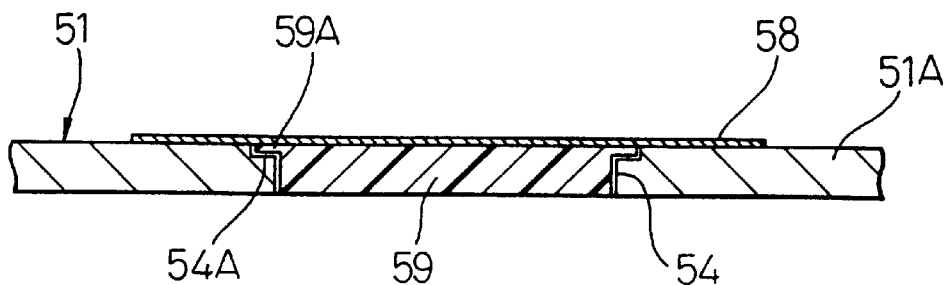
FIG. 17B is a sectional view showing the state in which the reference head insertion hole of FIG. 17A has been sealed.

FIGS. 17A, 17B show a method of sealing the reference head insertion holes 14, 54 of the first to third magnetic disk devices 20, 50, 60 described above according to another embodiment of the invention. The mere fact that the reference head insertion holes 14, 54 are enclosed by the seal member 58 after the reference signal is written in the disks 2, 52 would leave a recess due to the reference head insertion holes 14, 54 in the inner surface of the base bottoms 10, 51A, so that the wind flow caused by the rotation of the disks 2, 53 would be disturbed by the recess, thereby leading to a wind loss. The probable result is an increased power consumption of the spindle motor for rotating the disks 2, 53 and a louder noise.

According to this invention, a step 54A is formed around the reference insertion hole 54, as shown in FIG. 17A. The present invention therefore further comprises a spacer 59 having a flange 59A in such a shape as to just fit the reference head insertion hole 54 including the step 54A. This spacer 59 is fitted in the reference head insertion hole 54 after the reference signal is written in the disk 52 and a seal member 58 is applied over it. The resulting state is shown in FIG. 17B. Once the seal member 58 is applied on the base bottom surface 51A with the spacer 59 fitted in the reference head insertion hole 54 as described above, the boundary between the inner surface of the base 51 and the reference head insertion hole 54 is continuously smooth.

As a result, the wind generated by the rotation of the disk 52 flows smoothly and the wind loss is eliminated around the reference head insertion hole 54, thus reducing the power consumption of the spindle motor while at the same time decreasing the noise.

Figure 18:
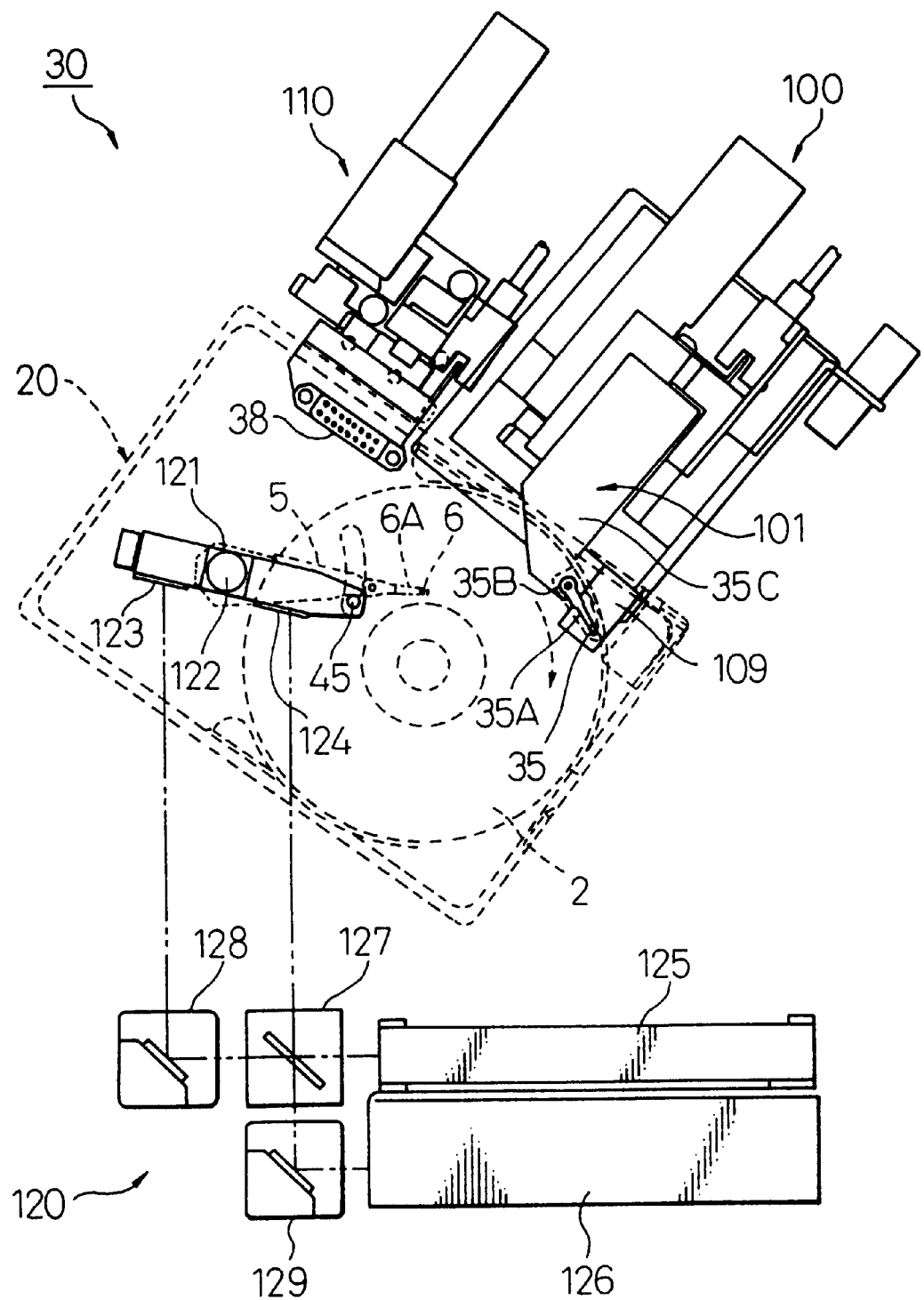
FIG. 18 is a plan view showing a specific configuration of a reference head, a connector contact pin and a positioning pin drive mechanism of a servo track writer according to the present invention.

FIG. 18 shows a specific configuration of the servo track writer 30 according to this invention including a drive mechanism 100 for the reference head 35, a drive mechanism 110 for the connector contact pin 38 and a moving mechanism 120 for the positioning pin 45 of the carriage 5. Also, the position of the magnetic disk device 20 mounted on the servo track writer 30 is indicated by dashed lines in this diagram.

The reference head 35 is held by a holding mechanism 101 including an arm 35A, a support 35B and a movable table 35C. The movable table 35C is adapted to rise and fall when driven by the drive mechanism 100.

Figure 19A:
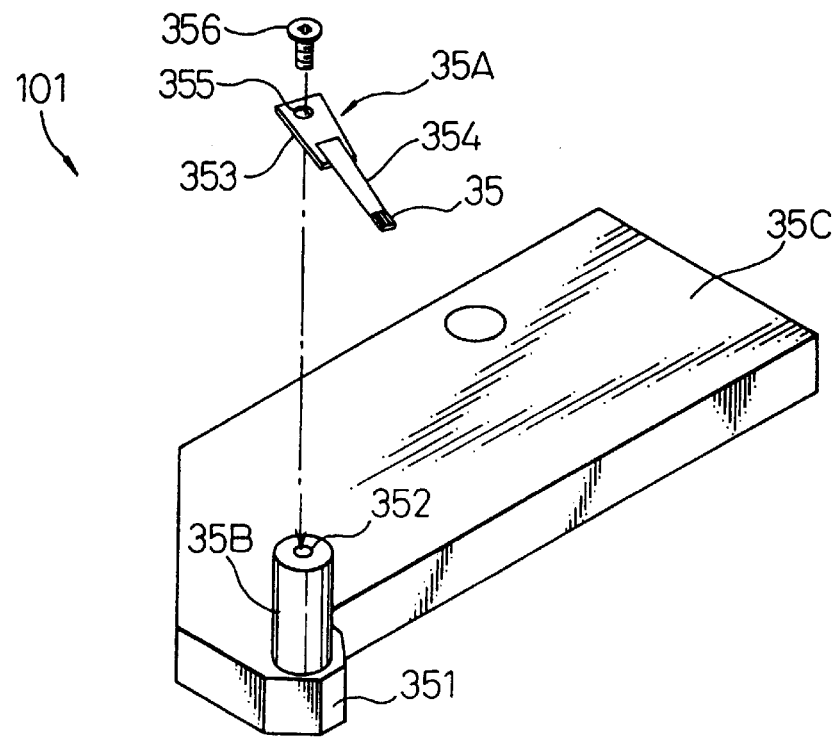
FIG. 19A is a perspective assembly view showing a configuration of a reference head and a holding mechanism therefor.

FIG. 19A shows a configuration of the reference head 35 and the holding mechanism 101 thereof. The movable table 35C is made of a thick plate, and has an end thereof formed with a peninsula 351. The peninsula 351 has the support 35B protruded therefrom. A threaded hole 352 is formed in the top surface of the support 35B. The arm 35A includes a base plate 353 and a support spring 354. The reference head 35 is mounted on the upper surface of the forward end of the support spring 354. A screw 356 is passed through a mounting hole 355 formed in the base plate 353, and is screwed in the threaded hole 352 of the support 35B, so that the reference head 35 is replaceably arranged on the support 35B through the arm 35A.

Figure 19B:
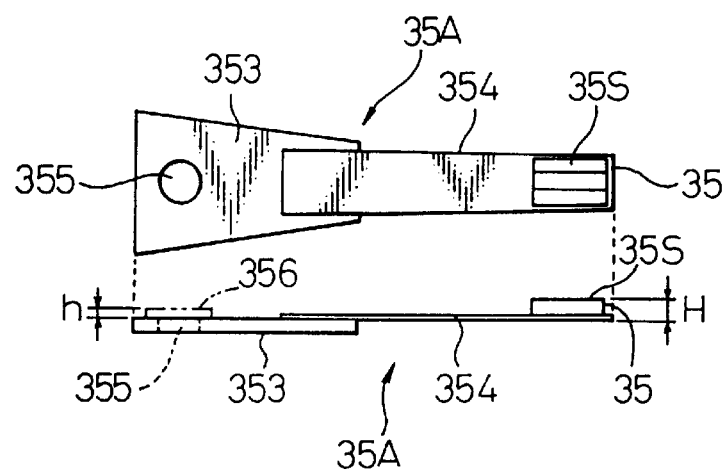
FIG. 19B is a plan view and a side view of the reference head shown in FIG. 19A.

FIG. 19B shows a configuration of the reference head 35 and the arm 35A thereof. The thickness of the base plate 353 is about 0.2 mm. The thickness of the support spring 354 mounted by being welded to the base plate 353 on the other hand, is about 30 $\mu$m. Actually, the reference head 35 is mounted on the head slider 35S having a height of about 0.3 mm. The height h of the screw head of the screw 356 for securing the base plate 353 to the support 35B is smaller than the height H of the head slider 35S, above the surface of the base plate 353.

Also, according to this invention, the head slider 35S having the reference head 35 is of in-line type and is arranged in parallel with the arm 35A. As a result, the head 6 and the arm 6A mounted at the forward end of the carriage 5 of the magnetic disk device 20 shown in FIG. 18 can be used directly as the arm 35A having the reference head 35. Even in the case where the reference head 35 is worn out and must to be replaced, the head 6 and the arm 6A of the magnetic disk device 20 can be used as they are, thus reducing the cost of the servo track writer 30.

The conventional reference head 35 explained with reference to FIG. 13b, on the other hand, has a special shape with the head slider 35S mounted in the direction perpendicular to the longitudinal direction of the arm 35A. In the conventional reference head 35 explained with reference to FIG. 13b, therefore, the head 6 and the arm 6A of the magnetic disk device are required to be designed and fabricated separately from each other. In addition, the demand for the conventional reference head 35 is smaller than that for the heads of the magnetic disk device, and therefore is not suitably mass-produced, resulting in a high unit cost.

Figure 20:
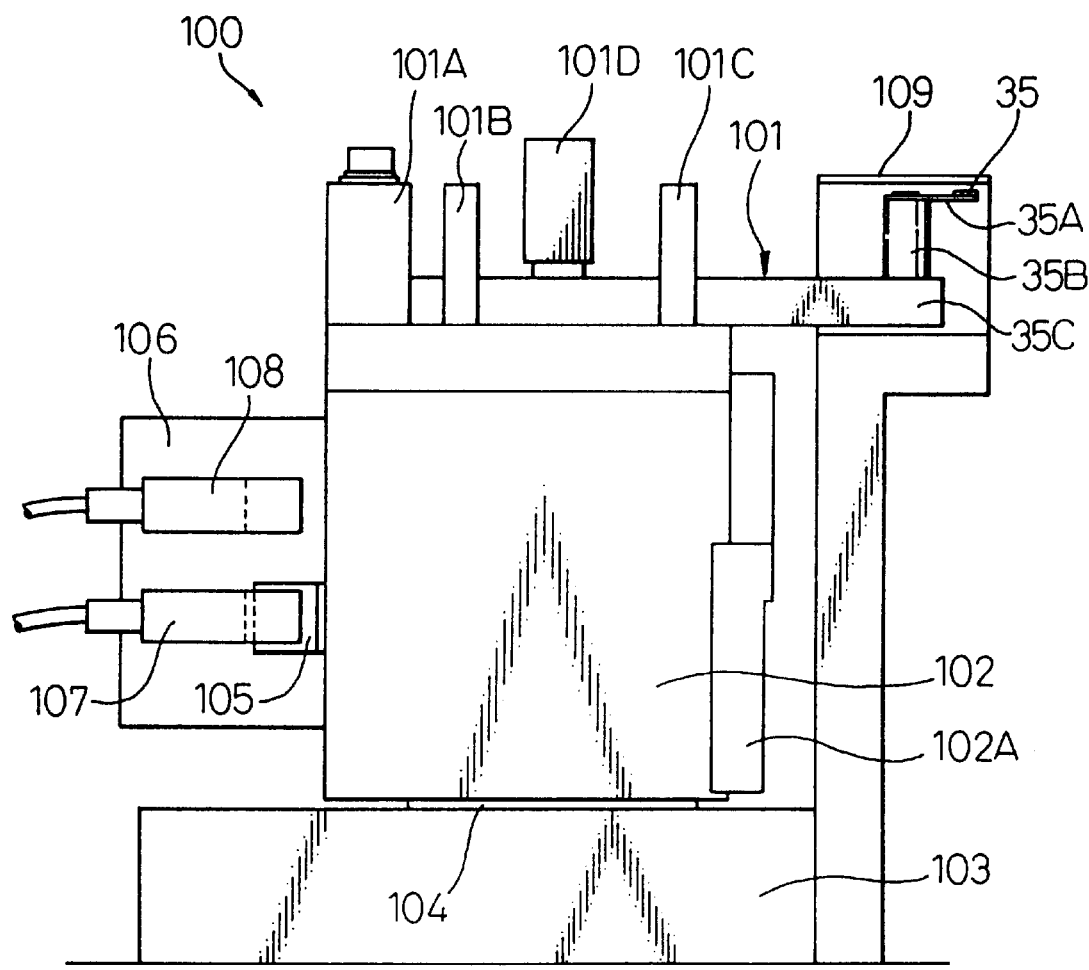
FIG. 20 is a side view showing the state in which the reference head drive mechanism of the servo track write is not in operation.

FIG. 20 is a side view of the reference head drive mechanism 100 of the servo track writer 30 not in operation according to the present invention. The reference head drive mechanism 100 includes a lift mechanism 102 for rising and lowering the movable table 35C, and the lift mechanism 102 moves up and down along a straight guide 104 protruded from a pedestal 103. The height of the lift mechanism 102 from the pedestal 103 is detected by a position-detecting shield plate (interrupter) 105 arranged on the side of the lift mechanism 102 and a first position sensor 107 and a second position sensor 108 arranged on the wall surface 106 perpendicular to the pedestal 103. While the reference head drive mechanism 100 is not in operation, the reference head 35 is protected by a protective cover 109 applied on the upper portion thereof. This protective cover 109 is provided for the dual purposes of protecting the reference head 35 from dust and preventing the reference head 35 from being inadvertently damaged by the operator at the time of replacing the parts of the servo track writer 30 with repair parts. In FIG. 20, numerals 101A to 101C designate butt pins used for mounting the movable table 35C and numeral 101D a knob for determining a mounting position. Also, numeral 102A designates a gear of the lift mechanism 102.

Figure 21:
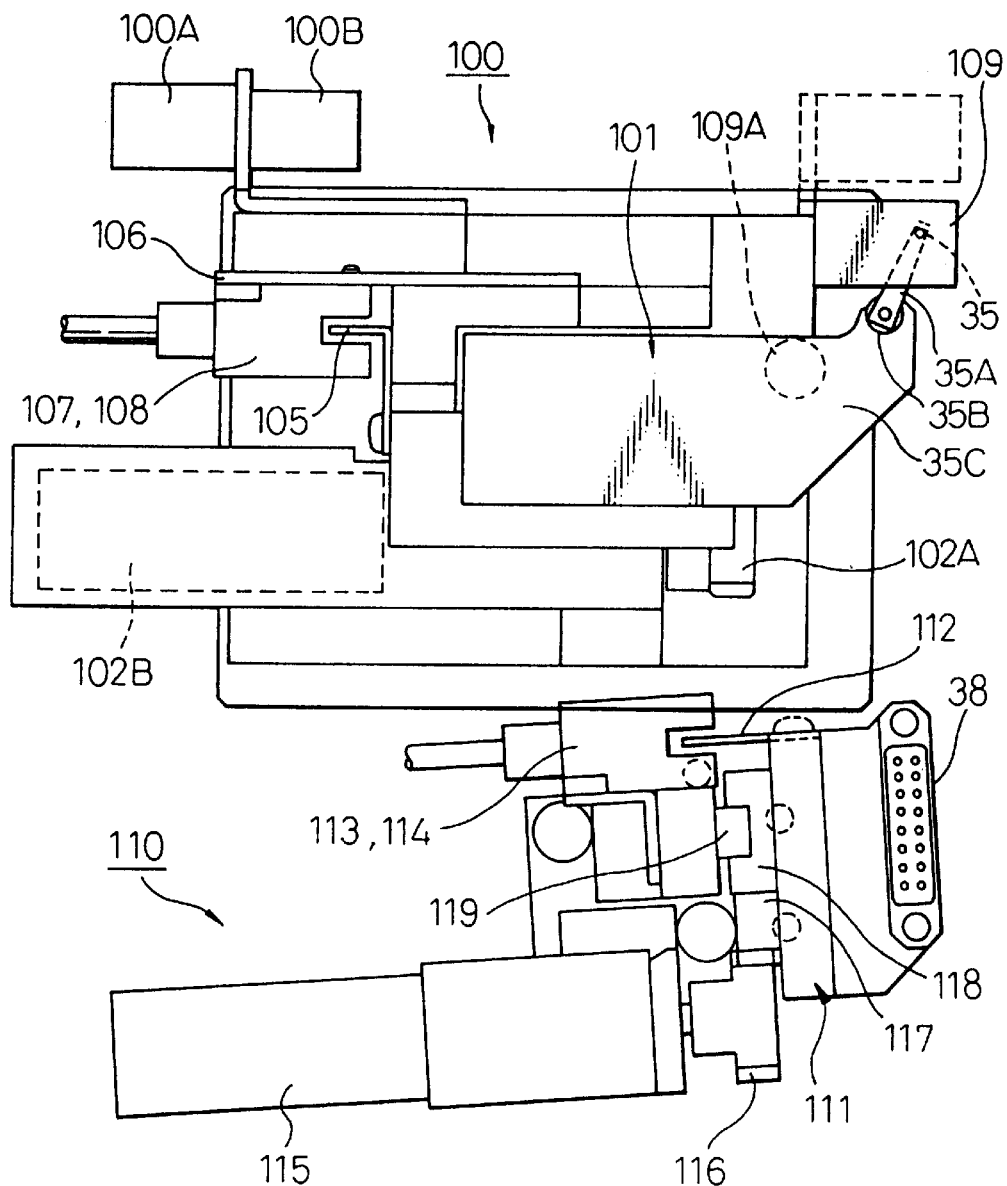
FIG. 21 is a plan view showing the state in which the reference head drive mechanism of the servo track write is not in operation.

FIG. 21 is a plan view of the reference head drive mechanism 100 and the connector contact pin drive mechanism 110 of the servo track writer 30, not being in operation, according to the present invention. The first position sensor 107 and the second position sensor 108 in this embodiment can be configured of a light sensor, for example. The interrupter 105 intrudes the space between a light-emitting element and a photo-detector arranged in the first position sensor 107 or in the second position sensor 108 and thus by interrupting the light between the two, the position of the interrupter 105 can be detected. Also, the protective cover 109 applied on the upper portion of the reference head 35 is adapted to open automatically by the operation of an air cylinder 109A located under the movable table 35C when the magnetic disk device 20 is loaded in the servo track writer 30 and the power supply of the servo track writer 30 is switched on. Further, the protective cover 109 can be arranged to close automatically when the interrupter 105 moves from the second position sensor 108 to the first position sensor 107. Therefore, when the reference drive mechanism 100 is in operation (when the reference signal is written by the reference head 35), the protective cover 109 has moved to the position indicated by dashed line and therefore the lifting operation of the reference head 35 is never adversely affected.

If the protective cover 109 is operated manually, the reference head 35 might come into contact with the protective cover 109 which might be left closed inadvertently, or the open cover may cause dust to become attached to the reference head 35. The automatic operation of the protective cover 109 is intended to eliminate the possibility of such inconveniences.

The movable table 35C is moved up or down by a rack-and-pinion mechanism, not shown, when the gear 102A is rotated with the rotation of the motor 102B. Numerals 100A, 100B in the diagram designate connectors used for imparting motor power or a sensor signal.

The connector contact pin drive mechanism 110, like the reference head drive mechanism 100, includes a lift mechanism 111 for the connector contact pin 38, a interrupter 112 for indicating the position of the lift mechanism 111 and two position sensors 113, 114 located at similar positions to the first and second position sensors 107, 108 of the reference head drive mechanism 100. The two position sensors 113, 114 can also be configured of light sensors. The lifting position of the connector contact pin mechanism 110 when the servo track writer 30 is in operation or out of operation is controlled by the interrupter 112 and the two position sensors 113, 114.

The lift mechanism 111 includes a motor 115 for rotating the gear (pinion) 16, a rack 117 adapted to engage the gear 116, a linear guide 118 and a guide pole 119. With the rotation of the motor 115, the gear 116 begins to rotate and the rack 117 moves up or down. The rack 117 is mounted on the linear guide 118. When the rack 117 moves up or down, therefore, the linear guide 118 is moved up or down by being guided by the guide pole 119, so that the connector contact pin 38 moves up or down accordingly.

Figure 22:
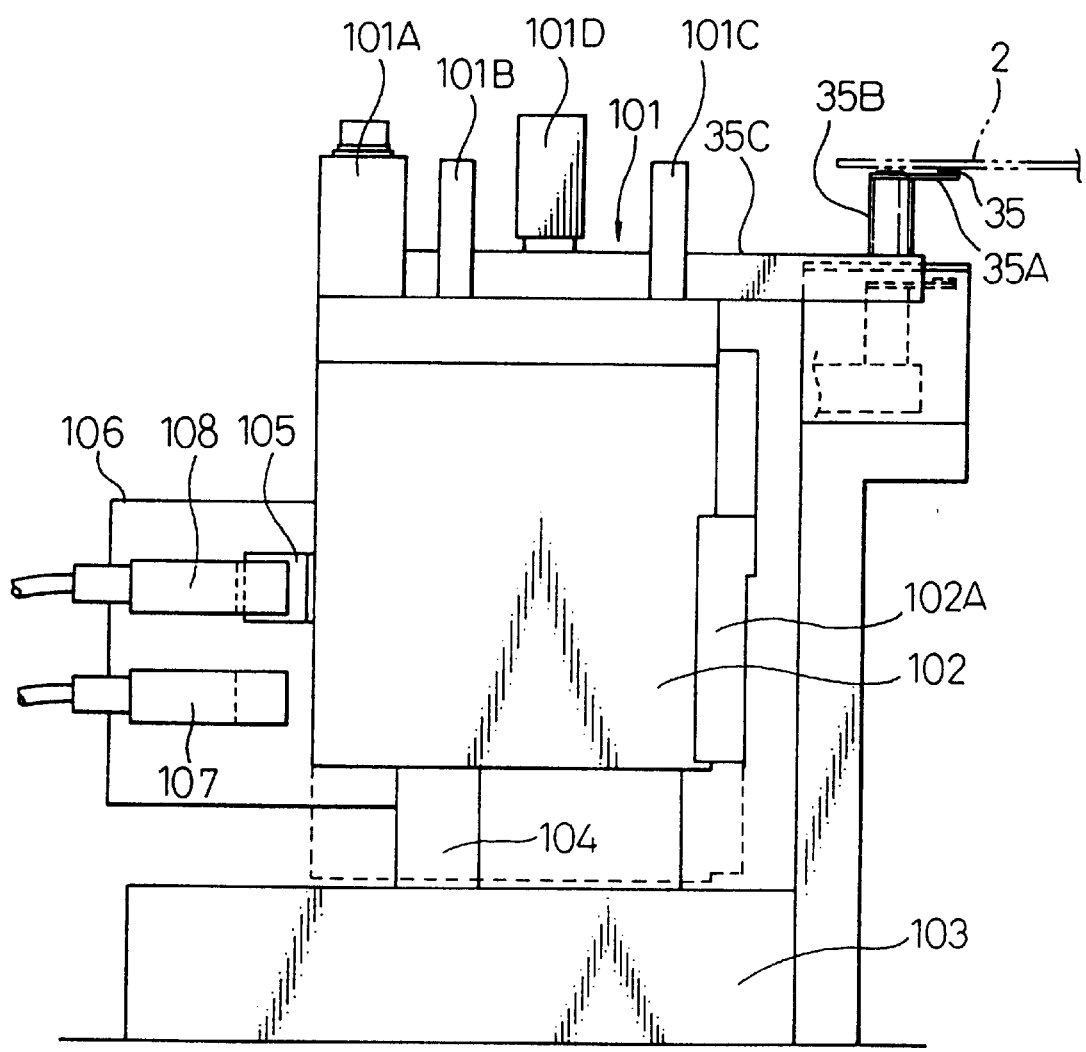
FIG. 22 is a side view showing the reference head drive mechanism of the servo track writer in servo track write operation according to the present invention.

FIG. 22 shows the state of the reference head drive mechanism 100 of the servo track writer 30 according to the present invention at the time of servo track write operation. At the time of servo track write operation, the lift mechanism 102 moves up along a linear guide 104 protruded from a pedestal 103 thereby to move up the movable table 35C. The position to which the lift mechanism 102 moves up is detected by the interrupter 105 and the first position sensor 108. When the movable table 35C is moved up to the upper limit by the lift mechanism 102, the reference head 35 mounted on the support 35B through the arm 35A is ready to write a reference signal into the magnetic disk 2.

The positioning pin moving mechanism 120 of the servo track writer 30 moves the carriage 5 of the magnetic disk device 20 by the positioning pin 45, as shown in FIG. 18. The positioning pin moving mechanism 120 includes a swing arm 121 with the positioning pin 45 protruded from an end thereof, a rotative shaft 122 of the swing arm, two reflection mirrors 123, 124 disposed on the sides of the rotative shaft 122, a laser light source 125, a laser light detector 126, a polarized beam splitter 127 for splitting the laser light into two portions and another two reflection mirrors 128, 129.

The laser light emitted from the laser light source 125 is split into two directions by a beam splitter 127 providing a half mirror. One of the light rays directly reaches the reflection mirror 124 on the swing arm 121, while the other light ray is reflected on the reflection mirror 128 and reaches the reflection mirror 123 on the swing arm 121. The laser light reflected on the reflection mirror 123 is reflected on the reflection mirror 128 and the beam splitter 127 and reaches the laser light detector 126. The laser light reflected on the reflection mirror 124, on the other hand, is reflected on the reflection mirror 129 and reaches the laser light detector 126.

The laser light detector 126 detects the rotational angle of the carriage 5 of the magnetic disk device 20 according to the incident conditions of the laser light reflected from the reflection mirrors 123, 124. In the case where the rotational angle of the carriage 5 of the magnetic disk device 20 is changed, a control signal is output to the positioning pin moving mechanism 120. Thus, the carriage 5 is pressed by the positioning pin 45 thereby to change the rotational angle thereof.

Figure 23:
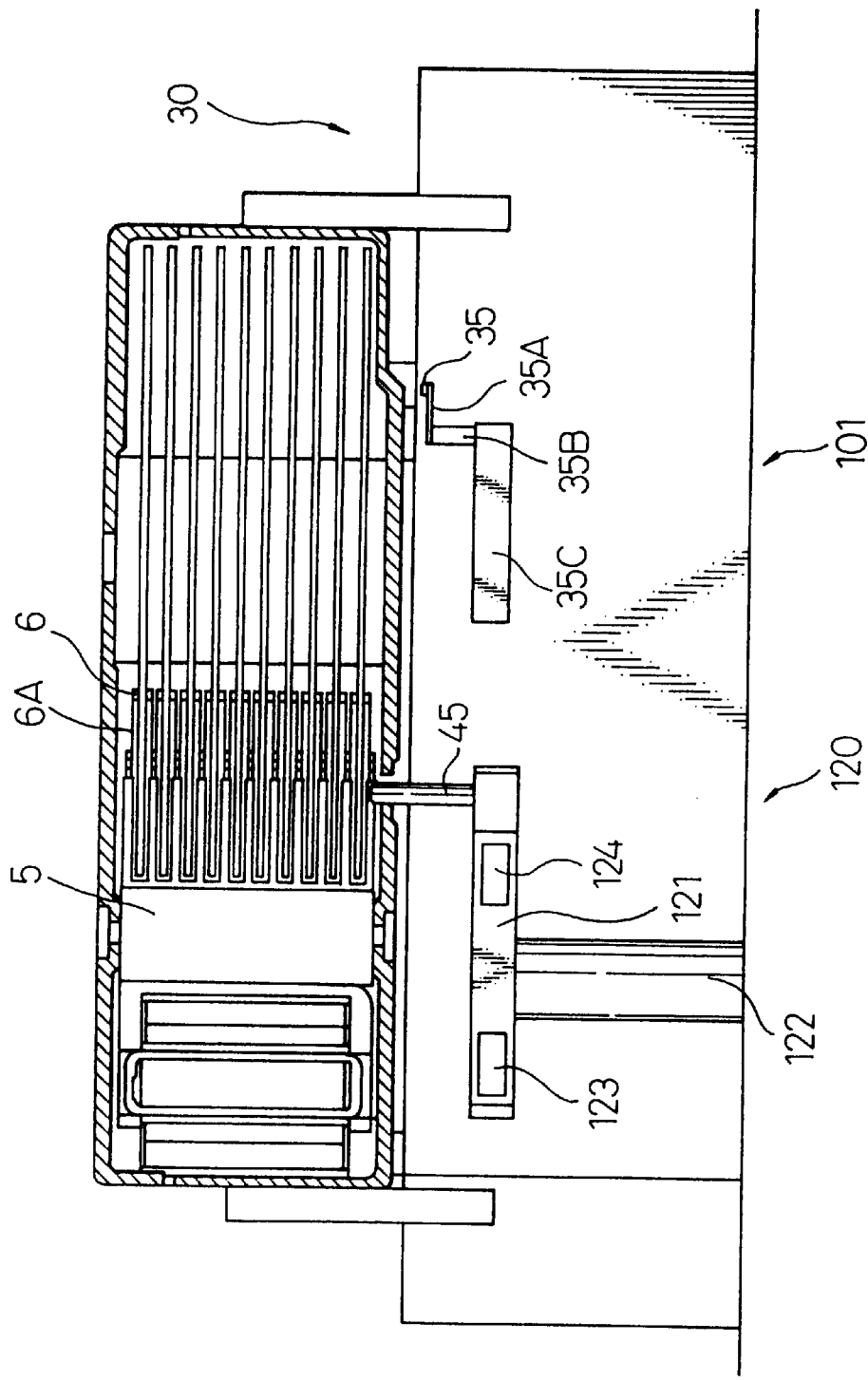
FIG. 23 is a diagram for explaining relative positions of the positioning pin drive mechanism and the reference head holding mechanism of the servo track writer according to the present invention.

FIG. 23 is a diagram for explaining relative positions of the positioning pin drive mechanism 20 and the reference head holding mechanism 101 in the servo track writer 30 according to the invention described with reference to FIG. 18. As shown, according to this invention, the holding mechanism 101 of the reference head 35 is arranged on the same side as the reflection mirrors 123, 124 on the swing arm 121 of the positioning pin drive mechanism 20 of the servo track writer 30. The drive mechanisms of the servo track writer 30 can thus be collectively arranged on the same side and the servo track writer 30 can be reduced in size.

Figure 24:
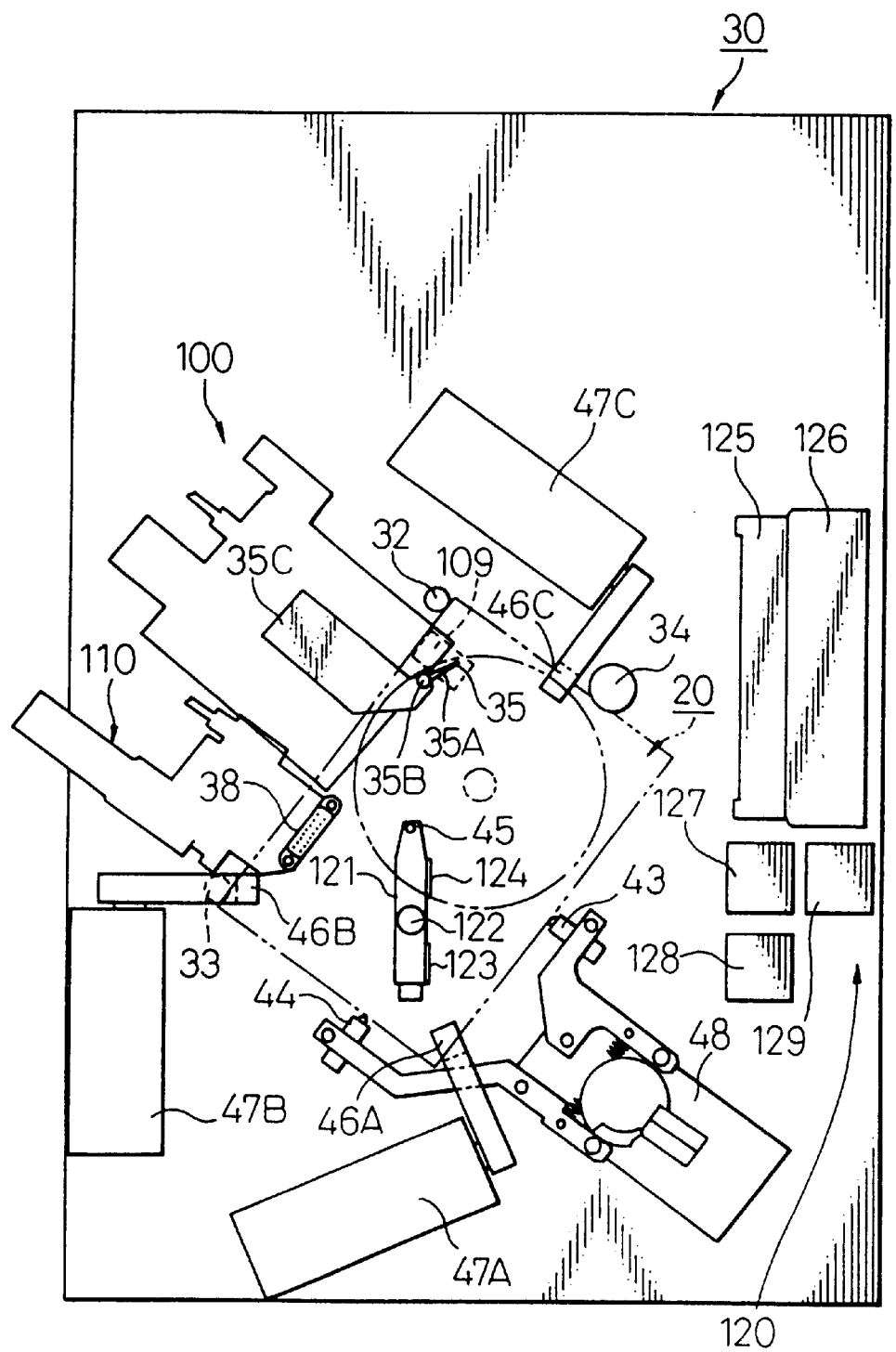
FIG. 24 is a plan view showing a general configuration of the servo track writer according to the invention.

FIG. 24 shows a general configuration of the servo track writer 30 according to the embodiment described above. This diagram shows an example arrangement of the studs 32, 33, 34, the X and Y dampers 43, 44, the holding members 46A to 46C, the reference head drive mechanism 100, the connector contact pin drive mechanism 110 and the positioning pin moving mechanism 120 on the servo track writer 30. In FIG. 24, numerals 47A to 47C designate drive mechanisms for the holding members 46A to 46C, and numeral 48 designates a drive mechanism for the dampers 43, 44.

As described above, according to the present invention, there is provided a housing structure of a disk device of a bath-tub type having built therein a spindle motor with the recording disks mounted thereon, a carriage with head mounted thereon for exchanging signals with the disks and an actuator for driving the carriage, wherein the base rigidity is improved and the unnecessary base vibrations are reduced, so that the error of the servo signal can be reduced considerably as compared with the prior art, thus leading to the advantage that the density of a track pitch can be improved without adversely affecting the reliability.

According to the present invention, there is also provided an apparatus for writing a reference signal into the disk device, in which the base of the disk device is firmly fixed when the reference signal is written, thereby leading to the advantage that the reference signal can be written with a high reliability.

Further, according to the present invention, there is provided an apparatus for writing a reference signal into the disk device, in which the reference head is of in-line type compatible with the head of the magnetic disk device, and therefore, if worn out and must be replaced, can be replaced with the head of the magnetic disk device directly, thereby leading to the advantage of a reduced cost of the reference signal writing apparatus.

Furthermore, according to the present invention, there is provided an apparatus for writing a reference signal into the disk device, in which the reference head is covered when the writing apparatus is not in operation, and therefore the reference head is protected from damage, thereby leading to the advantage of an improved durability.

What is more, according to the present invention, there is provided an apparatus for writing a reference signal into the disk device, in which the reference head drive mechanism can be arranged on the same side as the positioning pin drive mechanism, thereby leading to the advantage of a reduced size of the reference signal writing apparatus.

What is claimed is:

1. A disk device comprising:

a spindle motor with at least a recording disk mounted thereon;

a carriage with at least one head mounted thereon for writing information into said disk or reading information from said disk;

an actuator for driving said carriage;

a bath tub shaped base having an outer profile, a mounting portion, an upper surface, a bottom surface plate, and an inner peripheral surface, said base accommodating said spindle motor, said carriage, and said actuator therein, said base including a reference head insertion hole for inserting thereinto a reference head for writing a reference signal into said disk at the time of manufacturing said disk device;

a cover having an outer profile, said cover mounted on said base upper surface for hermetically sealing said spindle motor, said carriage and said actuator;

at least one type of damping means for reducing the vibration of said base, said damping means being arranged on a selected one of said base bottom surface plate and a side of said base adjacent to said bottom surface plate;

wherein said cover outer profile is smaller than said base outer profile by at least an amount equivalent to the thickness of said base, and said cover is not protruded above said base upper surface when said cover is mounted on said mounting portion of said base inner peripheral surface.

2. A disk device according to claim 1, wherein one of said damping means is a thickness of said bottom surface plate of said base increased to a maximum within a specified size of said base.

3. A disk device according to claim 2, wherein one of said damping means is a protrusion formed on said base for accommodating a flange on the base side of said spindle motor, said protrusion including a mounting hole of the required minimum size formed at the forward end surface thereof for mounting said flange of said spindle motor.

4. A disk device according to claim 1, wherein the thickness of said bottom surface plate of said base for a 3.5 in. disk device is increased to at least 5 mm within a specified size of said base.

5. A disk device according to claim 4, wherein one of said damping means is a protrusion formed on said base for accommodating a flange on the base side of said spindle motor, said protrusion including a mounting hole of the required minimum size formed at the forward end surface thereof for mounting said flange of said spindle motor.

6. A disk device according to claim 1, wherein one of said damping means has first, second and third reference surfaces formed in the neighborhood of different sides of said base bottom surface plate for fixing said disk device in a vertical direction relative to a reference signal writing jig at the time of writing a reference signal onto said disk in the process of manufacture of said disk device, said first to third reference surfaces being arranged in contact with reference points, respectively, formed on said jig, said base being adapted to be held at least at one point thereof vertically opposed to said first to third reference surfaces when fixing said disk device in the vertical direction to said jig using said reference surfaces, a base component material being filled between each of said reference surfaces and said point held on said base.

7. A disk device according to claim 6, wherein at least one mounting hole is formed in said base bottom surface plate for mounting a printed board having mounted thereon a circuit for driving said disk device, said printed board being fixed to said mounting hole and including an insertion hole for receiving a base protrusion and a connector for exchanging signals with component parts in said base.

8. A disk device according to claim 1, wherein a depression is formed on an upper side of said cover mounted on the upper surface of said base, said depression having mounted therein a damping plate for further reducing vibrations.

9. A disk device according to claim 8, wherein at least one mounting hole is formed in said base bottom surface plate for mounting a printed board having mounted thereon a circuit for driving said disk device, said printed board being fixed to said mounting hole and including an insertion hole for receiving a base protrusion and a connector for exchanging signals with component parts in said base.

10. A disk device according to claim 1, wherein one of said damping means is a protrusion formed on said base for accommodating a flange on the base side of said spindle motor, said protrusion including a mounting hole of the required minimum size formed at the forward end surface thereof for mounting said flange of said spindle motor.

* * * * *

UNITED STATES PATENT AND TRADEMARK OFFICE
CERTIFICATE OF CORRECTION

PATENT NO.     : 6,373,654 B1
DATED          : April 16, 2002
INVENTOR(S)    : Iwahara et al.

It is certified that error appears in the above-identified patent and that said Letters Patent is hereby corrected as shown below:

<u>Title page, Item [54] and Column 1 and line 1,</u>
Delete "DISK DEVICE AND APPARATUS FOR WRITING REFERENCE SIGNAL INTO THE DEVICE" and insert -- DISK DEVICE AND APPARATUS HAVING A RIGID HOUSING STRUCTURE --.

Signed and Sealed this

Seventeenth Day of June, 2003

JAMES E. ROGAN
*Director of the United States Patent and Trademark Office*